(12) United States Patent
Stucchi et al.

(10) Patent No.: US 8,844,480 B2
(45) Date of Patent: Sep. 30, 2014

(54) INTERNAL-COMBUSTION ENGINE HAVING A SYSTEM FOR VARIABLE ACTUATION OF THE INTAKE VALVES, PROVIDED WITH THREE-WAY SOLENOID VALVES

(75) Inventors: Sergio Stucchi, Orbassano (IT); Onofrio De Michele, Orbassano (IT); Raffael Ricco, Orbassano (IT); Marcello Gargano, Orbassano (IT); Francesco Vattaneo, Orbassano (IT); Domenico Lepore, Orbassano (IT)

(73) Assignee: C.R.F. Societa Consortile per Azioni, Orbassano (Torino) (IT)

( * ) Notice: Subject to any disclaimer, the term of this patent is extended or adjusted under 35 U.S.C. 154(b) by 0 days.

(21) Appl. No.: 13/591,886

(22) Filed: Aug. 22, 2012

(65) Prior Publication Data
US 2013/0133596 A1    May 30, 2013

(30) Foreign Application Priority Data
Nov. 24, 2011    (EP) .................................... 11190639

(51) Int. Cl.
*F01L 9/02*    (2006.01)
*F01L 1/34*    (2006.01)
*F01L 1/25*    (2006.01)

(52) U.S. Cl.
CPC ....................................... *F01L 1/25* (2013.01)
USPC ................... 123/90.13; 123/90.12; 123/90.16

(58) Field of Classification Search
USPC ........................ 123/90.12–90.13, 90.15, 90.16
See application file for complete search history.

(56) References Cited

U.S. PATENT DOCUMENTS 5,154,143 A * 10/1992 Stutzenberger ............ 123/90.12
6,267,098 B1 * 7/2001 Vanderpoel .................... 123/321
7,559,300 B2 7/2009 Ruggiero
2003/0005898 A1 * 1/2003 Gianolio et al. ........... 123/90.13

(Continued)

FOREIGN PATENT DOCUMENTS

DE    30 48 887 A1    7/1982
EP    0 803 642    11/2000

(Continued)

OTHER PUBLICATIONS

European Search Report for EP Application No. 11190639.2, dated May 7, 2012.

(Continued)

*Primary Examiner* — Zelalem Eshete
*Assistant Examiner* — Steven D Shipe
(74) *Attorney, Agent, or Firm* — Nixon & Vanderhye P.C.

(57) ABSTRACT

An internal-combustion engine with two intake valves for each cylinder is provided with a system for variable actuation of the intake valves, comprising a single solenoid valve for each cylinder that controls communication of the pressurized-fluid chamber of the system with an exhaust channel. The solenoid valve is a three-way, three-position solenoid valve, comprising an inlet permanently communicating with the pressurized-fluid chamber and with the hydraulic actuator of an intake valve, and two outlets communicating, respectively, with the actuator of the other intake valve and with said exhaust channel. The solenoid valve has a first position, in which the inlet communicates with both of the outlets, a second position, in which the inlet communicates only with the aforesaid outlet connected to the actuator of an intake valve and does not communicate, instead, with the outlet connected to the exhaust channel, and a third position, in which the inlet does not communicate with any of the two outlets.

5 Claims, 15 Drawing Sheets

(56) References Cited

U.S. PATENT DOCUMENTS

| | | |
|---|---|---|
| 2003/0154938 A1 | 8/2003 | Vattaneo et al. |
| 2004/0000287 A1 | 1/2004 | Borean et al. |
| 2004/0083994 A1* | 5/2004 | Afjeh et al. ............. 123/90.12 |
| 2004/0103868 A1* | 6/2004 | Engelberg ............... 123/90.12 |
| 2005/0126522 A1 | 6/2005 | Ruggiero |
| 2006/0137634 A1 | 6/2006 | Vattaneo et al. |
| 2007/0131289 A1 | 6/2007 | Pataki |
| 2009/0250023 A1 | 10/2009 | Minato et al. |
| 2010/0294220 A1 | 11/2010 | Ferreri et al. |
| 2010/0326384 A1 | 12/2010 | Vattaneo |

FOREIGN PATENT DOCUMENTS

| | | |
|---|---|---|
| EP | 0 803 642 B1 | 11/2000 |
| EP | 1 273 770 A2 | 1/2003 |
| EP | 1 378 637 | 1/2004 |
| EP | 1 674 673 A1 | 6/2006 |
| EP | 1 555 398 | 2/2007 |
| EP | 1 674 673 | 3/2007 |
| EP | 1 803 913 | 7/2007 |
| EP | 1 508 676 | 2/2008 |
| EP | 1 936 132 | 6/2008 |
| EP | 2 019 189 | 1/2009 |
| EP | 2 138 680 | 12/2009 |
| EP | 2 261 471 | 12/2010 |
| EP | 2 597 276 A1 | 5/2013 |
| WO | WO 03/067035 | 8/2003 |
| WO | 2004/113774 A2 | 12/2004 |

OTHER PUBLICATIONS

International Search Report and Written Opinion, issued Jan. 7, 2014 in International Application No. PCT/IB2013/051383, International filed Feb. 20, 2013 (11 pages).

European Search Report dated Feb. 7, 2013 issued in European Patent Application No. 12178720.4, 4 pp.

* cited by examiner

INTERNAL-COMBUSTION ENGINE HAVING A SYSTEM FOR VARIABLE ACTUATION OF THE INTAKE VALVES, PROVIDED WITH THREE-WAY SOLENOID VALVES

This application claims priority to EP Application No. 11190639.2, filed 24 Nov. 2001, the entire contents of which is hereby incorporated by reference.

FIELD OF THE INVENTION

The present invention relates to internal-combustion engines of the type comprising, for each cylinder:
a combustion chamber;
at least two intake ducts and at least one exhaust duct which give out into said combustion chamber;
at least two intake valves and at least one exhaust valve associated to said intake and exhaust ducts and provided with respective return springs that push them towards a closed position;
a camshaft for actuating the intake valves, by means of respective tappets;
wherein each intake valve is controlled by the respective tappet against the action of the aforesaid return spring by interposition of hydraulic means including a pressurized-fluid chamber facing which is a pumping plunger connected to the valve tappet, said pressurized-fluid chamber being designed to communicate with the chamber of a hydraulic actuator associated to each intake valve;
a single solenoid valve for each cylinder, designed to set said pressurized-fluid chamber in communication with an exhaust channel in order to decouple each intake valve from the respective tappet and cause fast closing of the intake valves as a result of the respective return springs; and
electronic control means, for controlling said solenoid valve so as to vary the instant of opening and/or the instant of closing and the lift of each intake valve as a function of one or more operating parameters of the engine.

An engine of the above type is described, for example, in any one of the documents EP 0 803 642 B1, EP 1 555 398, EP 1 508 676 B1, EP 1 674 673 B1 and EP 2 261 471 A1, all filed in the name of the present applicant.

PRIOR ART

The present applicant has been developing for some time internal-combustion engines comprising a system for variable actuation of the intake valves of the type indicated above, marketed under the trade name "MULTIAIR". The present applicant is the holder of numerous patents and patent applications regarding engines provided with a system of the type specified above.

FIG. 1 of the annexed drawings shows a cross-sectional view of an engine provided with the "MULTIAIR" system, as described in the European patent No. EP 0 803 642 B1.

With reference to said FIG. 1, the engine illustrated therein is a multicylinder engine, for example an inline-four-cylinder engine, comprising a cylinder head 1. The cylinder head 1 comprises, for each cylinder, a cavity 2 formed by the base surface 3 of the cylinder head 1, defining the combustion chamber, giving out in which are two intake ducts 4, 5 and two exhaust ducts 6. The communication of the two intake ducts 4, 5 with the combustion chamber 2 is controlled by two intake valves 7, of the traditional poppet type, each comprising a stem 8 slidably mounted in the body of the cylinder head 1.

Each valve 7 is recalled into the closing position by springs 9 set between an internal surface of the cylinder head 1 and an end valve retainer 10. Communication of the two exhaust ducts 6 with the combustion chamber is controlled by two valves 70, which are also of a traditional type, associated to which are springs 9 for return towards the closed position.

Opening of each intake valve 7 is controlled, in the way that will be described in what follows, by a camshaft 11 rotatably mounted about an axis 12 within supports of the cylinder head 1, and comprises a plurality of cams 14 for actuation of the intake valves 7.

Each cam 14 that controls an intake valve 7 co-operates with the plate 15 of a tappet 16 slidably mounted along an axis 17, which, in the case of the example illustrated in the prior document cited, is set substantially at 90° with respect to the axis of the valve 7. The plate 15 is recalled against the cam 14 by a spring associated thereto. The tappet 16 constitutes a pumping plunger slidably mounted within a bushing 18 carried by a body 19 of a pre-assembled unit 20, which incorporates all the electrical and hydraulic devices associated to actuation of the intake valves, according to what is described in detail in what follows.

The pumping plunger 16 is able to transmit a thrust to the stem 8 of the valve 7 so as to cause opening of the latter against the action of the elastic means 9, by means of pressurized fluid (preferably oil coming from the engine-lubrication circuit) present in a pressure chamber C facing which is the pumping plunger 16, and by means of a plunger 21 slidably mounted in a cylindrical body constituted by a bushing 22, which is also carried by the body 19 of the subassembly 20.

Once again in the known solution illustrated in FIG. 1, the pressurized-fluid chamber C associated to each intake valve 7 can be set in communication with an exhaust channel 23 via a solenoid valve 24. The solenoid valve 24, which can be of any known type, suitable for the function illustrated herein, is controlled by electronic control means, designated schematically by 25, as a function of signals S indicating operating parameters of the engine, such as the position of the accelerator and the engine r.p.m.

When the solenoid valve 24 is open, the chamber C enters into communication with the channel 23 so that the pressurized fluid present in the chamber C flows in said channel, and a decoupling is obtained of the cam 14 and of the respective tappet 16 from the intake valve 7, which thus returns rapidly into its closing position under the action of the return springs 9. By controlling the communication between the chamber C and the exhaust channel 23, it is consequently possible to vary as desired the time and stroke of opening of each intake valve 7.

The exhaust channels 23 of the various solenoid valves 24 all give out into one and the same longitudinal channel 26 communicating with pressure accumulators 27, only one of which is visible in FIG. 1.

All the tappets 16 with the associated bushings 18, the plungers 21 with the associated bushings 22, the solenoid valves 24 and the corresponding channels 23, 26 are carried and constituted by the aforesaid body 19 of the pre-assembled unit 20, to the advantage of rapidity and ease of assembly of the engine.

The exhaust valves 70 associated to each cylinder are controlled, in the embodiment illustrated in FIG. 1, in a traditional way, by a respective camshaft 28, via respective tappets 29, even though in principle there is not excluded, in the case of the prior document cited, an application of the hydraulic-actuation system also to control of the exhaust valves.

Once again with reference to FIG. 1, the variable-volume chamber defined inside the bushing 22 and facing the plunger 21 (which in FIG. 1 is illustrated in its condition of minimum volume, given that the plunger 21 is in its top end-of-travel position) communicates with the pressurized-fluid chamber C via an opening 30 made in an end wall of the bushing 22. Said opening 30 is engaged by an end nose 31 of the plunger 21 in such a way as to provide hydraulic braking of the movement of the valve 7 in the closing stage, when the valve is close to the closing position, in so far as the oil present in the variable-volume chamber is forced to flow in the pressurized-fluid chamber C passing through the clearance existing between the end nose 31 and the wall of the opening 30 engaged thereby. In addition to the communication constituted by the opening 30, the pressurized-fluid chamber C and the variable-volume chamber of the plunger 21 communicate with one another via internal passages made in the body of the plunger 21 and controlled by a non-return valve 32, which enables passage of fluid only from the pressurized chamber C to the variable-volume chamber of the plunger 21.

During normal operation of the known engine illustrated in FIG. 1, when the solenoid valve 24 excludes communication of the pressurized-fluid chamber C with the exhaust channel 23, the oil present in said chamber transmits the movement of the pumping plunger 16, imparted by the cam 14, to the plunger 21 that governs opening of the valve 7. In the initial step of the movement of opening of the valve, the fluid coming from the chamber C reaches the variable-volume chamber of the plunger 21 passing through the non-return valve 32 and further passages that set the internal cavity of the plunger 21, which has a tubular conformation, in communication with the variable-volume chamber. After a first displacement of the plunger 21, the nose 31 exists from the opening 30 so that the fluid coming from the chamber C can pass directly into the variable-volume chamber through the opening 30, which is now free.

In the opposite movement of closing of the valve, as has already been said, during the final step the nose 31 enters the opening 30 causing hydraulic braking of the valve so as to prevent impact of the body of the valve against its seat, for example following upon an opening of the solenoid valve 24, which causes immediate return of the valve 7 into the closing position.

In the system described, when the solenoid valve 24 is activated, the valve of the engine follows the movement of the cam (full lift). An anticipated closing of the valve can be obtained by deactivating (opening) the solenoid valve 24 so as to empty out the hydraulic chamber and obtain closing of the valve of the engine under the action of the respective return springs. Likewise, a delayed opening of the valve can be obtained by delaying activation of the solenoid valve, whereas the combination of a delayed opening and an anticipated closing of the valve can be obtained by activation and deactivation of the solenoid valve during the thrust of the corresponding cam. According to an alternative strategy, in line with the teachings of the patent application No. EP 1 726 790 A1 filed in the name of the present applicant, each intake valve can be controlled in "multi-lift" mode, i.e., according to two or more repeated "subcycles" of opening and closing. In each subcycle, the intake valve opens and then closes completely. The electronic control unit is consequently able to obtain a variation of the instant of opening and/or of the instant of closing and/or of the lift of the intake valve, as a function of one or more operating parameters of the engine. This enables the maximum engine efficiency to be obtained, and the lowest fuel consumption, in every operating condition.

Technical Problem

FIG. 2 of the annexed drawings corresponds to FIG. 6 of EP 1 674 673 and shows the scheme of the system for actuation of the two intake valves associated to each cylinder, in a conventional MULTIAIR system. Said figure shows two intake valves 7 associated to one and the same cylinder of an internal-combustion engine, which are controlled by a single pumping plunger 16, which is in turn controlled by a single cam of the engine camshaft (not illustrated) acting against its plate 15. FIG. 2 does not illustrate the return springs 9 (see FIG. 1), which are associated to the valves 7 and tend to bring them back into the respective closing positions.

As may be seen, in the conventional system of FIG. 2, a single pumping plunger 16 controls the two valves 7 via a single pressure chamber C, communication of which with the exhaust is controlled by a single solenoid valve 24 and which is in hydraulic communication with both of the variable-volume chambers C1, C2 facing the plungers 21 for control of the two valves. The system of FIG. 2 is able to operate in an efficient and reliable way above all in the case where the volumes of the hydraulic chambers are relatively small. Said possibility is offered by the adoption of hydraulic tappets 400 on the outside of the bushings 22, according to what has already been illustrated in detail for example in the document No. EP 1 674 673 B1 filed in the name of the present applicant. In this way, the bushings 22 can have an internal diameter that can be chosen as small as desired.

FIG. 3 of the annexed drawings is a schematic representation of the system illustrated in FIG. 2, in which it is evident that both of the intake valves 7 associated to each cylinder of the engine have their actuators 21 permanently in communication with the pressure chamber C, which in turn can be set isolated from or connected to the exhaust channel 23 via the single solenoid valve 24.

The solution illustrated in FIGS. 2 and 3 enables obvious advantages from the standpoint of simplicity and economy of production, and from the standpoint of reduction of the overall dimensions, as compared to the solution illustrated, for example, in the document No. EP 0 803 642 B1, which envisages two solenoid valves for controlling separately the two intake valves of each cylinder.

On the other hand, the solution with a single solenoid valve per cylinder rules out the possibility of differentiating the control of the intake valves of each cylinder. Said differentiation is instead desirable, in particular in the case of diesel engines in which each cylinder is provided with two intake valves associated to respective intake ducts having conformations different from one another in order to generate different movements of the flow of air introduced into the cylinder (see, for example, FIG. 5 of EP 1 508 676 B1). Typically, in said engines the two intake ducts of each cylinder are shaped for optimizing, respectively, the flows of the "tumble" type and of the "swirl" type inside the cylinder, said forms of motion being fundamental for optimal distribution of the charge of air inside the cylinder, from which there depends in a substantial way the possibility of reducing the pollutant emissions at the exhaust.

As has been said, in the MULTIAIR systems with a single solenoid valve per cylinder, it is not possible to control in an independent way the two intake valves of each cylinder. It would, instead, be desirable to be able increase each time the fraction of charge of air introduced with the tumble motion and the fraction of charge of air introduced with the swirl motion as a function of the engine operating conditions (r.p.m., load, cold start, etc.).

Likewise, in an engine with controlled ignition, in particular when this works at partial loads or in idling conditions, there is posed the problem of having to introduce a small charge of air with a sufficient kinetic energy that will favour setting-up of a range of motion optimal for combustion inside the cylinder. In these operating conditions, it would consequently be preferable for the entire mass of air to be introduced by just one of the two intake valves to reduce the dissipative losses during traversal of the valve itself. In other words, once the mass of air that must be introduced into the combustion chamber has been fixed, and the pressure in the intake manifold has been fixed, and given the same evolution of the negative pressure generated by the motion of the piston in the combustion chamber, there are lower dissipation losses (and hence a higher kinetic energy) for the mass of air introduced by a single intake valve opened with a lift of approximately 2 h as compared to the case of the same mass of air introduced by two intake valves with a lift h.

OBJECT OF THE INVENTION

The object of the present invention is to propose an engine of the type indicated at the start of the present description that will be able to solve the problems indicated above and to meet the requirement of a differentiated control of the two intake valves of each cylinder, albeit using a single solenoid valve in association with each cylinder.

SUMMARY OF THE INVENTION

With a view to achieving the aforesaid object, the subject of the invention is an internal-combustion engine having the characteristics of claim 1.

For the purposes of the invention, any solenoid valve that has the characteristics indicated above can be used.

However, preferably, the engine according to the invention uses a solenoid valve specifically illustrated for the aforesaid purposes and that forms also the subject, taken in itself, of a copending patent application filed in the name of the present applicant.

The main characteristics of said solenoid valve are indicated in the annexed claim 2.

BRIEF DESCRIPTION OF THE FIGURES

Further characteristics and advantages of the invention will emerge from the ensuing description with reference to the annexed drawings, which are provided purely by way of non-limiting example and in which.

DETAILED DESCRIPTION OF THE PREFERRED EMBODIMENTS OF THE INVENTION

Figure 1:
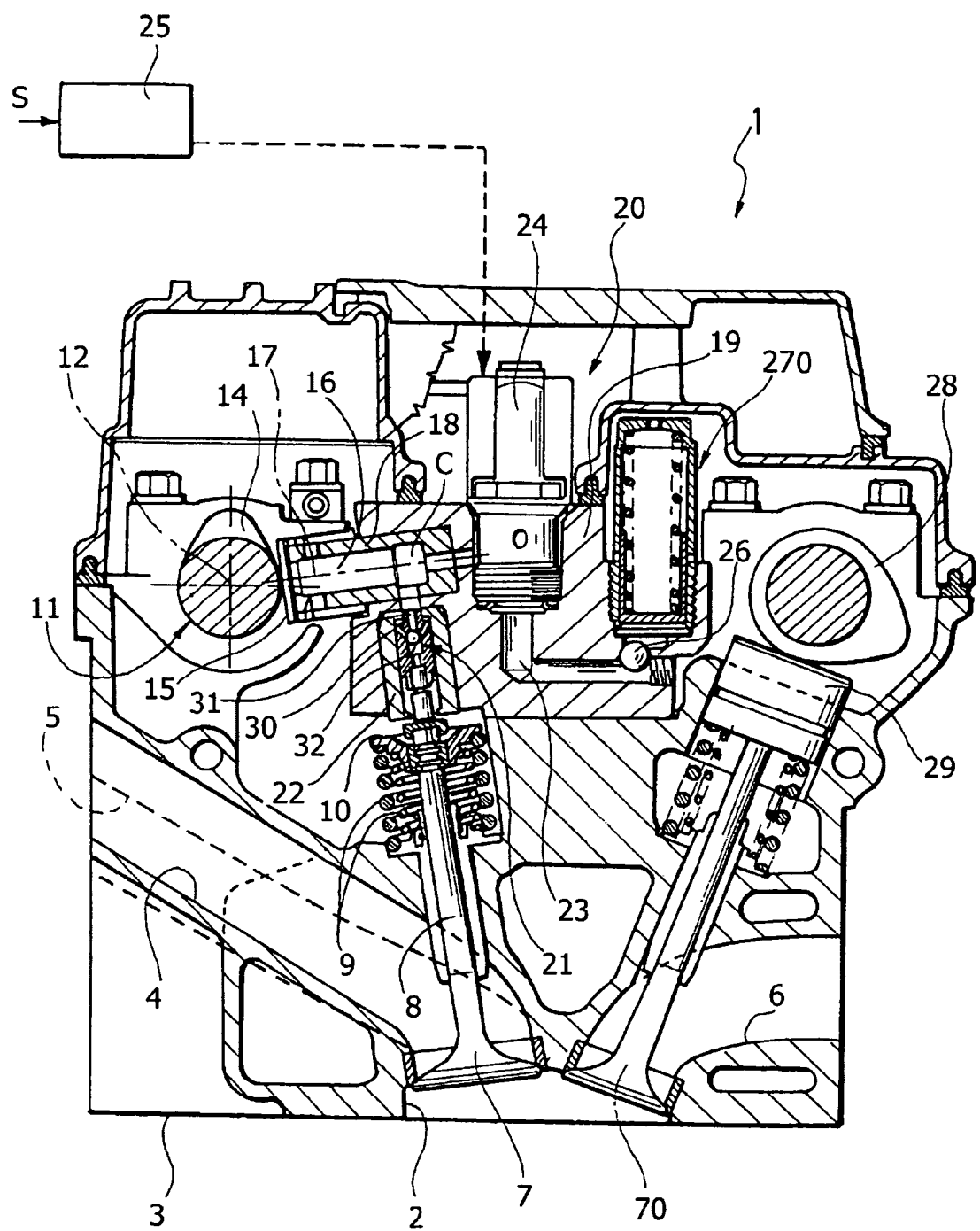
FIG. 1, already described above, illustrates in a cross-sectional view the cylinder head of an internal-combustion engine provided with a MULTIAIR system for variable actuation of the intake valves, according to what is illustrated in the document No. EP 0 803 642 B1.
Figure 2:
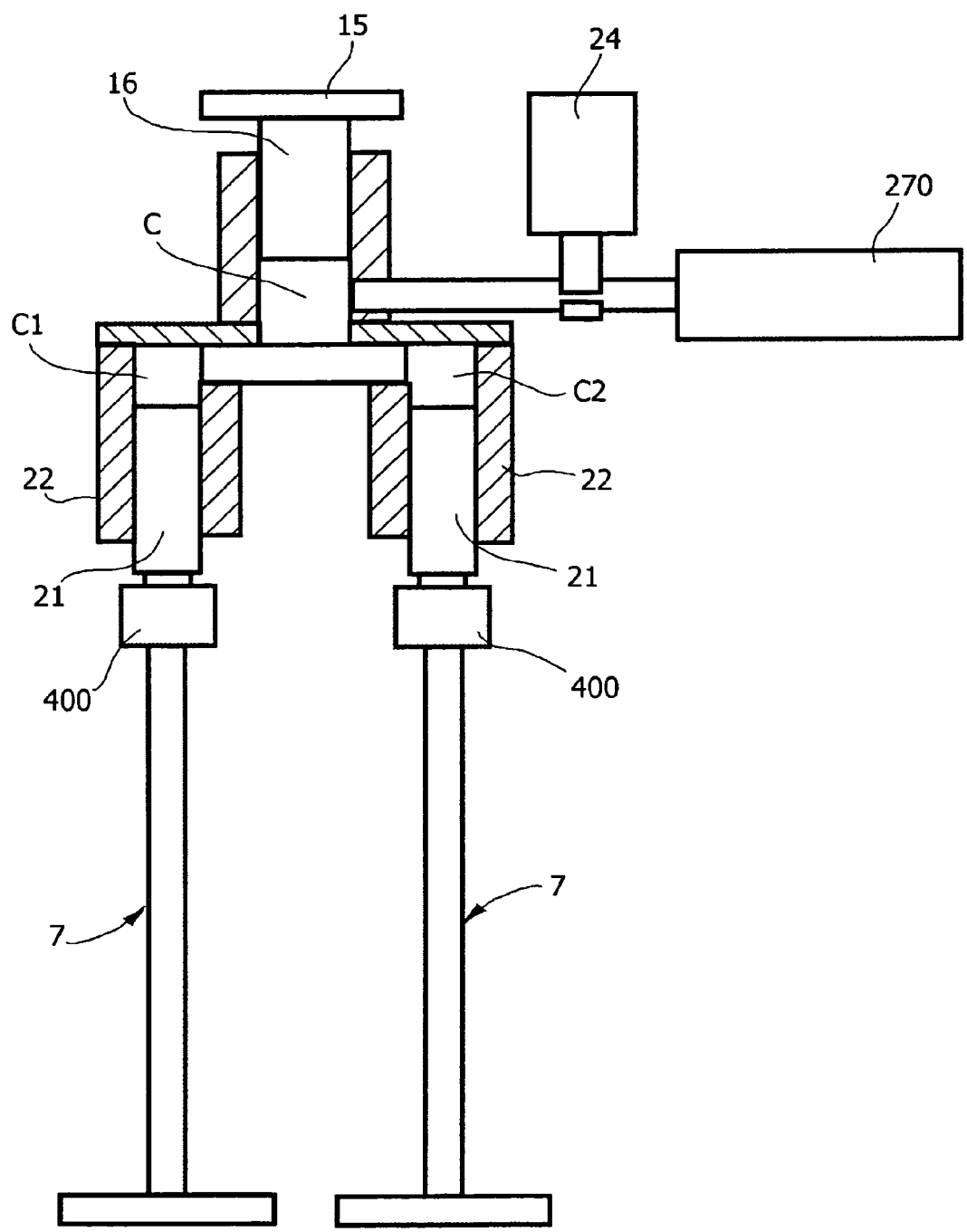
FIGS. 2 and 3, which have also already been described above, illustrate the control system of two intake valves associated to one and the same cylinder of the engine, in a MULTIAIR system of the conventional type for example described in EP 2 261 471 A1.
Figure 3:
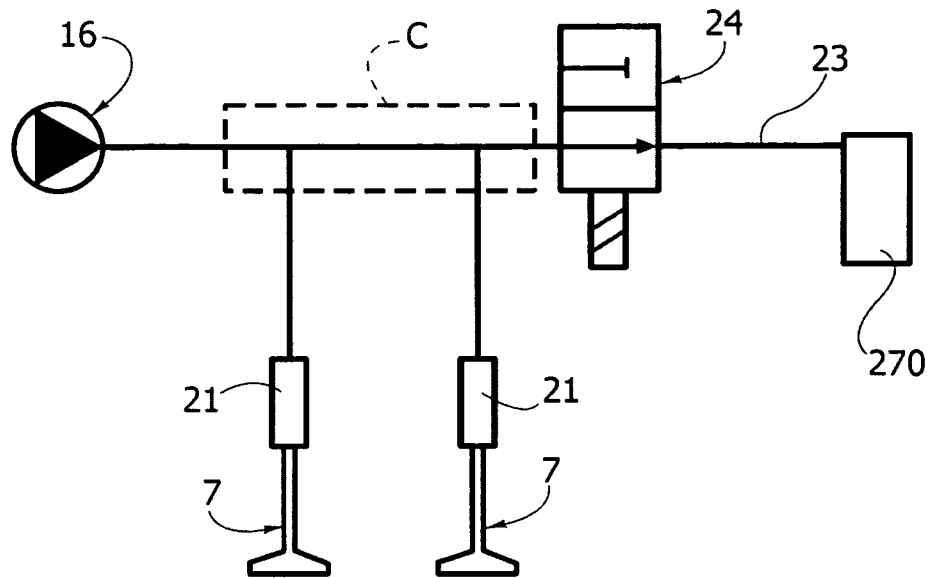
Figure 4:
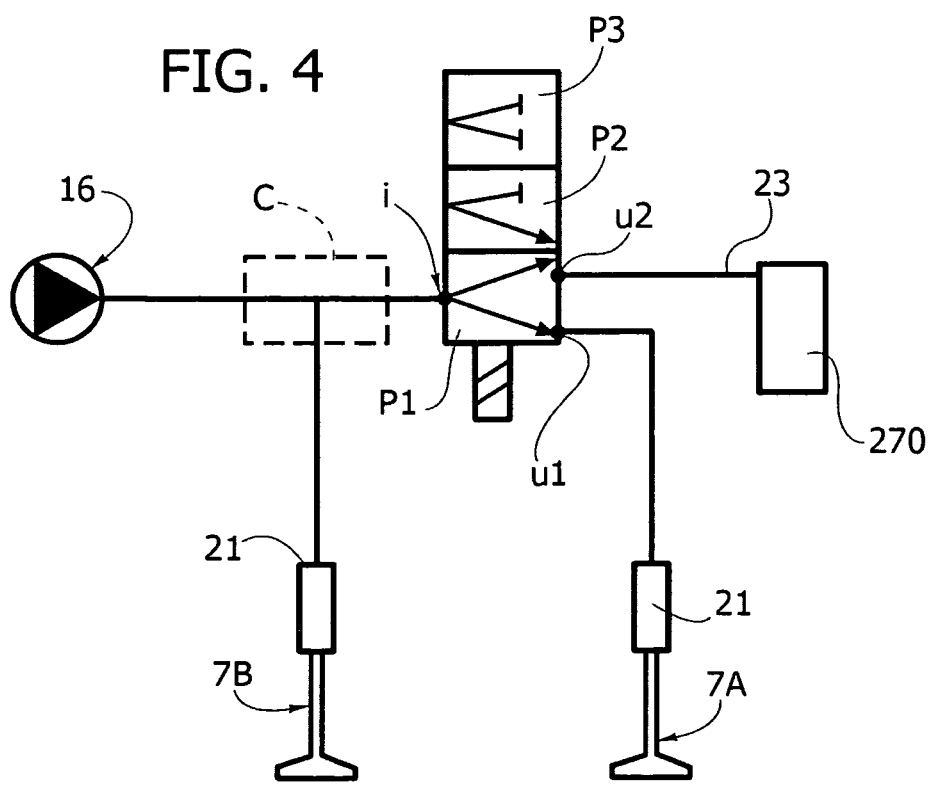
FIGS. 4-6 illustrate a scheme of the system for control of the two intake valves associated to one and the same cylinder, in the engine according to the invention.
Figure 5:
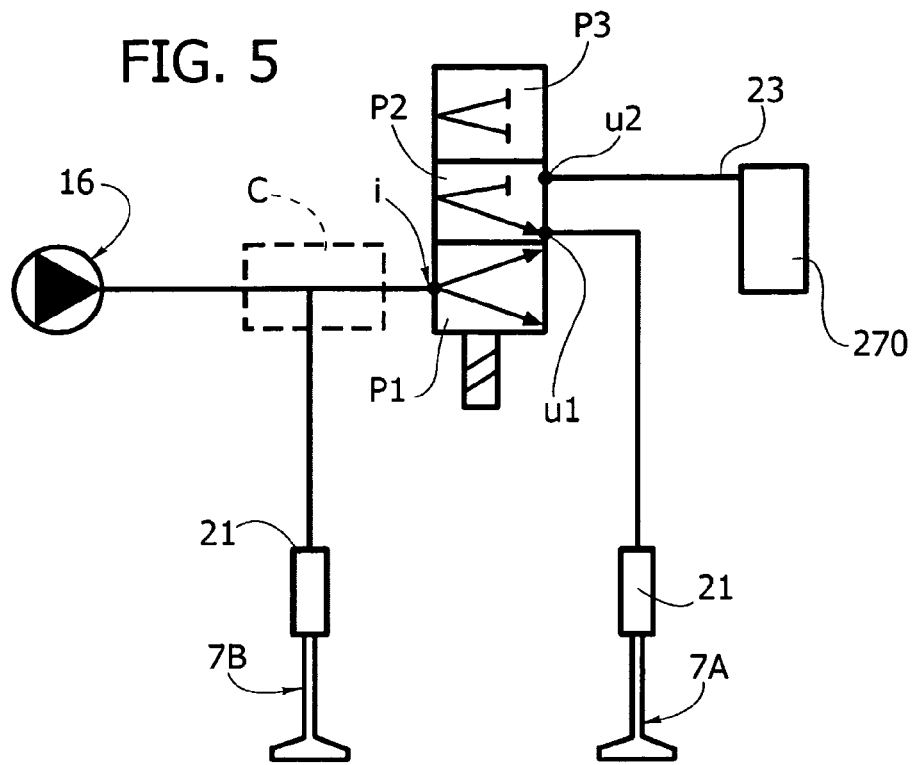
Figure 6:
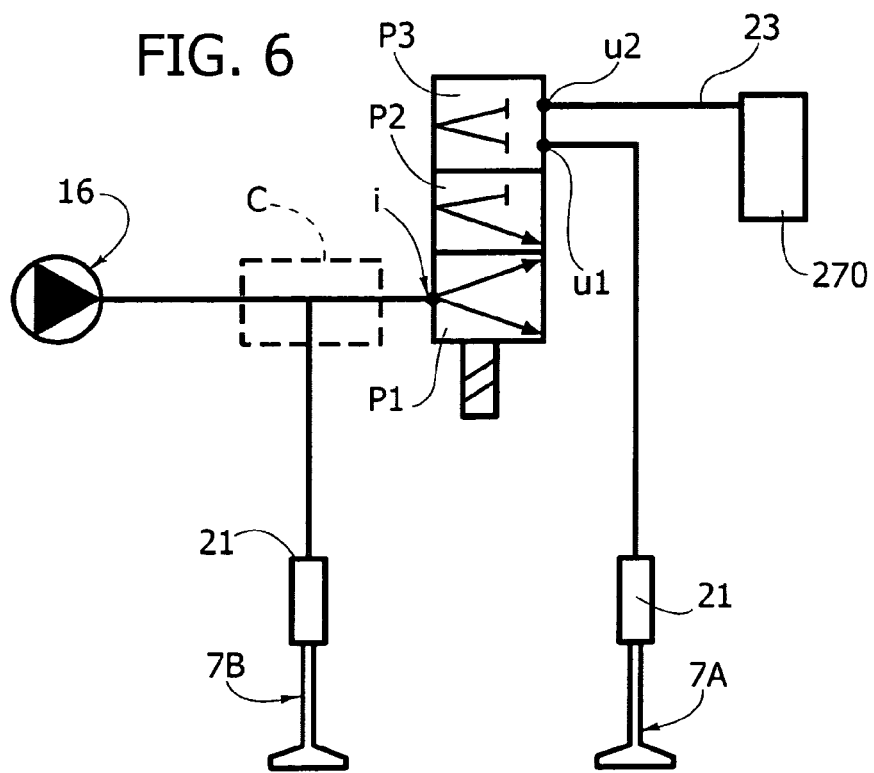

With reference to the schematic illustrations of FIGS. 4-6, the engine according to the invention is provided with a system for variable actuation of the intake valves of the engine according to the scheme shown in FIGS. 4-6 of the annexed drawings. As compared to the conventional solution illustrated in FIG. 3, as may be seen, the invention is distinguished in that the two intake valves associated to each cylinder of the engine (and designated in FIGS. 4-6 by the references 7A, 7B) are not both permanently connected with the pressurized-fluid chamber C. In the case of the invention, only one of the two intake valves (the valve that in the drawings is designated by the reference 7B) has its hydraulic actuator 21 permanently communicating with the pressurized-fluid chamber C. In addition, the two-way, two-position, solenoid valve 24 is replaced with a three-way, three-position, solenoid valve, having an inlet "i" permanently communicating with the pressurized-fluid chamber C and with the hydraulic actuator of the intake valve 7B, and two outlets u1, u2. The outlet u1 permanently communicates with the hydraulic actuator 21 of the intake valve 7A, whilst the outlet u2 is permanently connected to the exhaust channel 23 and to the hydraulic accumulator 270.

FIG. 4 illustrates the solenoid valve in its first operating position P1, corresponding to a de-energized condition of its solenoid. In said position, the inlet i is in communication with both of the outlets u1, u2 so that the hydraulic actuators of both of the intake valves 7A, 7B, as well as the pressurized-fluid chamber C, are in communication with the exhaust channel 23 and the accumulator 270 so that both of the valves are decoupled from the tappet and kept closed by the respective return springs.

FIG. 5 illustrates a second position of the solenoid valve in which the inlet i is in communication with the outlet u1, whilst the communication between the inlet i and the outlet u2 is interrupted. Consequently, in this condition, the actuators of both of the intake valves 7A, 7B are in communication with the pressure chamber C, and the latter is isolated from the exhaust channel 23 so that both of the intake valves are active and sensitive to the movement of the respective tappet.

FIG. 6 illustrates the third operating position of the solenoid valve, in which the inlet i is isolated from both of the outlets u1, u2 so that the pressurized-fluid chamber C is isolated from the exhaust environment 23 and the intake valve 7B is consequently active and sensitive to the movement of the respective tappet, whereas in this condition the actuator of the intake valve 7A is isolated from the pressurized-fluid chamber and is consequently decoupled from the movements of the respective tappet, so that only the intake valve 7B is active.

Hence, as has been seen, in the engine according to the invention it is possible to render the two intake valves 7A, 7B associated to each cylinder of the engine both sensitive to the movement of the respective tappet, or else again decouple them both from the respective tappet, causing them to be kept closed by the respective return springs, or else again it is possible to decouple from the tappet only the intake valve 7A, and leave only the intake valve 7B active.

When a command for opening of the valves 7A, 7B ceases, the solenoid valve is brought back into the position P1 for enabling the pumping element 16 to draw in a flow of oil from the volume 270 towards the volume C.

Figure 14:
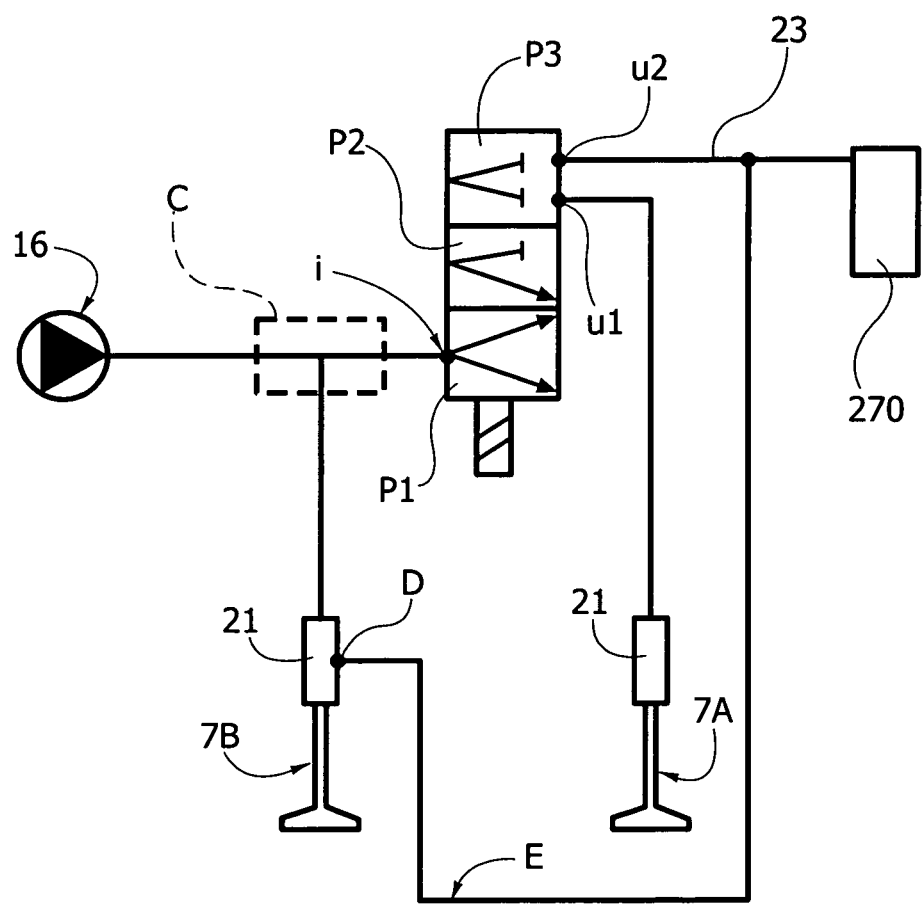
FIGS. 14-16 illustrate additional and preferred characteristics of the system of FIGS. 4-6.
Figure 15:
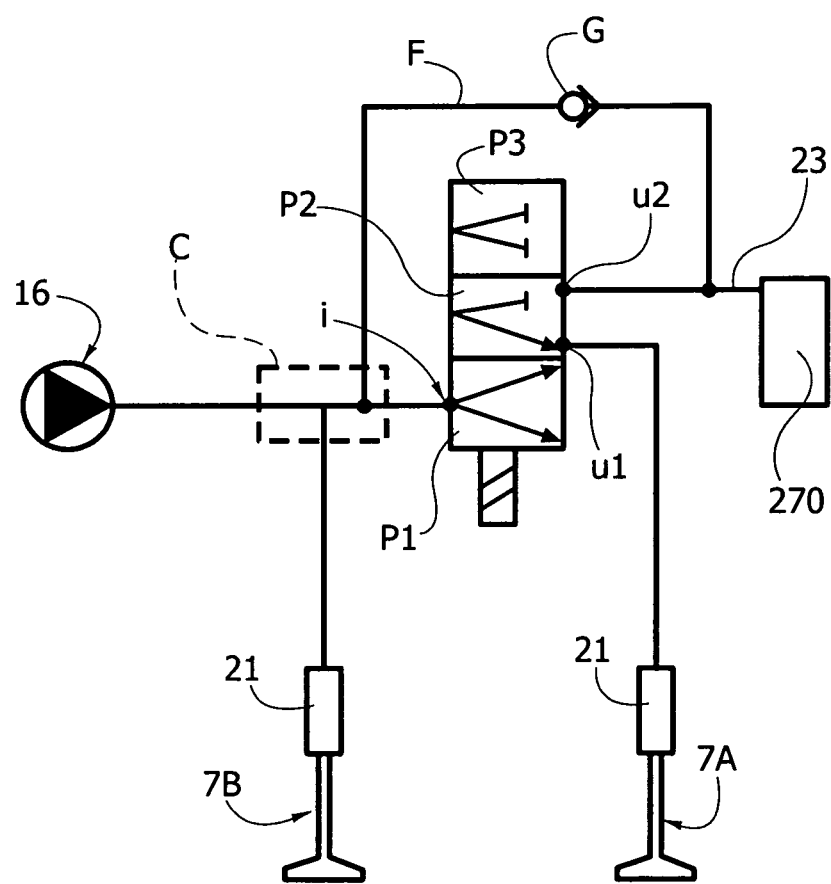
Figure 16:
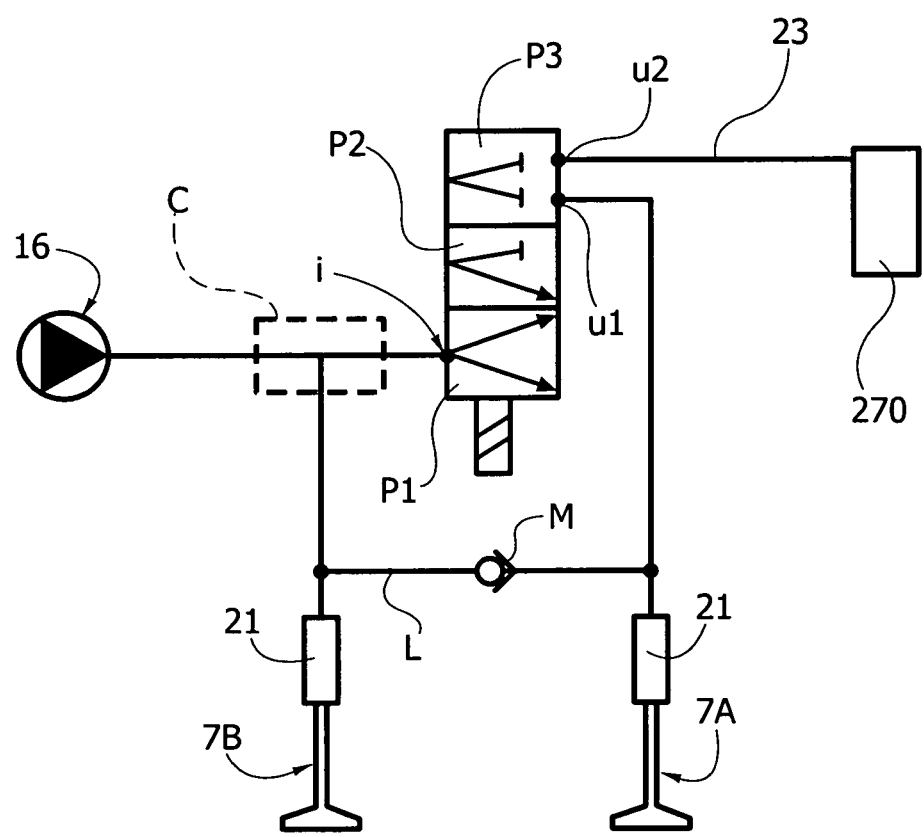

Preferably, the system according to the invention is provided with one or more of the solutions illustrated in FIGS. 14-16 of the annexed drawings.

When the system is in the position P3, given that the volume of fluid pumped by the pumping element 16 is fixed, and given that the volume between the outlet u1 and the chamber of the hydraulic actuator of the valve 7A vanishes, there is posed the problem of disposing of the volume of fluid in excess that in the position P2 is pumped into the delivery branch of the aforesaid valve 7A. This volume of fluid, in the absence of countermeasures, gives rise in the position P3 to a supplementary stroke of the valve 7B. In practice, if the valves 7A and 7B are the same as one another, then in the position P2 they both undergo a lift by a stroke h, whereas in the position P3 the valve 7A would remain closed whilst the valve 7B would present a stroke 2h. Said characteristic may be altogether acceptable, but if, instead, it is preferred to avoid it, the following countermeasure is adopted: the body of the hydraulic actuator 21 of the valve 7B is provided with an exhaust port D, which is overstepped by the plunger of the actuator after a pre-set stroke so as to set the chamber of the actuator in communication with the exhaust environment 23, 270 via a line E. In this way, the maximum lift of the two intake valves remains always the same, irrespective of the operating position of the solenoid valve.

With reference to FIG. 15, in the case where the solenoid valve were to remain blocked on account of failure in the position P2 or in the position P3, the engine would cease to function since there would not be reintegration of the fluid from the volume 270 to the control volume C (i.e., to the pumping element 16) during the intake stage of said pumping element 16, which is rendered possible in the position P1. In such an eventuality, to enable operation of the engine in limp-home mode, i.e., to guarantee operation of the engine even though with reduced functionality, a by-pass line F is envisaged, which connects the environment 23, 270 directly with the pressure chamber C, via a non-return valve G that enables only a flow of fluid in the direction of the chamber C and that functions as re-fill valve when the pumping element 16 creates a negative pressure during its intake stroke. In this way, if for example the solenoid valve remains blocked in the position P2 the engine functions with both of the intake valves once again in the full-lift mode, whereas, if the solenoid valve remains blocked in the position P3, the engine continues to function with just the valve 7B in full-lift mode.

With reference to FIG. 16, in the case where the valve remains blocked in the position P3 and the branch of the valve 7A remains under pressure without the possibility of being discharged towards the volume 23, 270, the valve 7A would remain open and could be damaged by the plunger of the respective actuator. The problem is hence not to guarantee a minimal degree of functionality as for the previous case, but is instead to prevent damage to the intake valve 7A. This problem can be solved by introducing a line L of direct connection between the line for supply of the fluid to the actuator of the valve 7A and the environment common to the pressure chamber C and the line for supply of the actuator of the valve 7B, with a non-return valve M interposed in said line L, to enable a flow of fluid only in the direction of the line for delivery to the valve 7B. The valve M intervenes only in the case described, i.e., only in the case where the solenoid valve remains blocked in the position P3 and the branch for supply of the actuator of the valve 7A remains under pressure. In fact, in this case, when the pumping element 16 starts its intake stroke, there is generated a flow of fluid from the branch of the valve 7A towards the chamber C, with the desired emptying of said branch and corresponding closing of the valve 7A.

During normal operation, instead, the valve M does not intervene. For example, if it is necessary to pass from the mode in which both of the valves 7A, 7B are active (position P2) to the mode in which only the valve 7B is active (position P3), emptying of the branch of the valve 7A and its closing are guaranteed in so far as the solenoid valve moves temporarily into the position P1 and then directly from P1 to P3.

As indicated above, the system of the invention can envisage one or more of the solutions illustrated with reference to FIGS. 14-16, even though preferably all the aforesaid solutions are envisaged.

Of course, the system according to the invention is unable to reproduce the same operating flexibility that it is possible to obtain in a system that envisages two separate solenoid valves for control of the two intake valves of each cylinder of the engine, but enables in any case a sufficient operating flexibility, as against a drastic reduction in complexity, cost, and dimensions of a solution with two solenoid valves.

As has already been clarified above, the system according to the invention can be implemented by resorting to a three-way, three-position solenoid valve having any structure and arrangement, provided that it responds to the general characteristics that have been described above.

Preferably, however, the solenoid valve used presents the further characteristics that are specified in the annexed claim 2. Said characteristics have been implemented in some preferred embodiments of a solenoid valve that has been specifically developed by the present applicant and that, as has been indicated, also forms the subject, taken in itself, of a copending patent application.

Said preferred embodiments of the solenoid valve that can be used in the system according to the invention are described in what follows with reference to FIGS. 7-13.

Figure 7A:
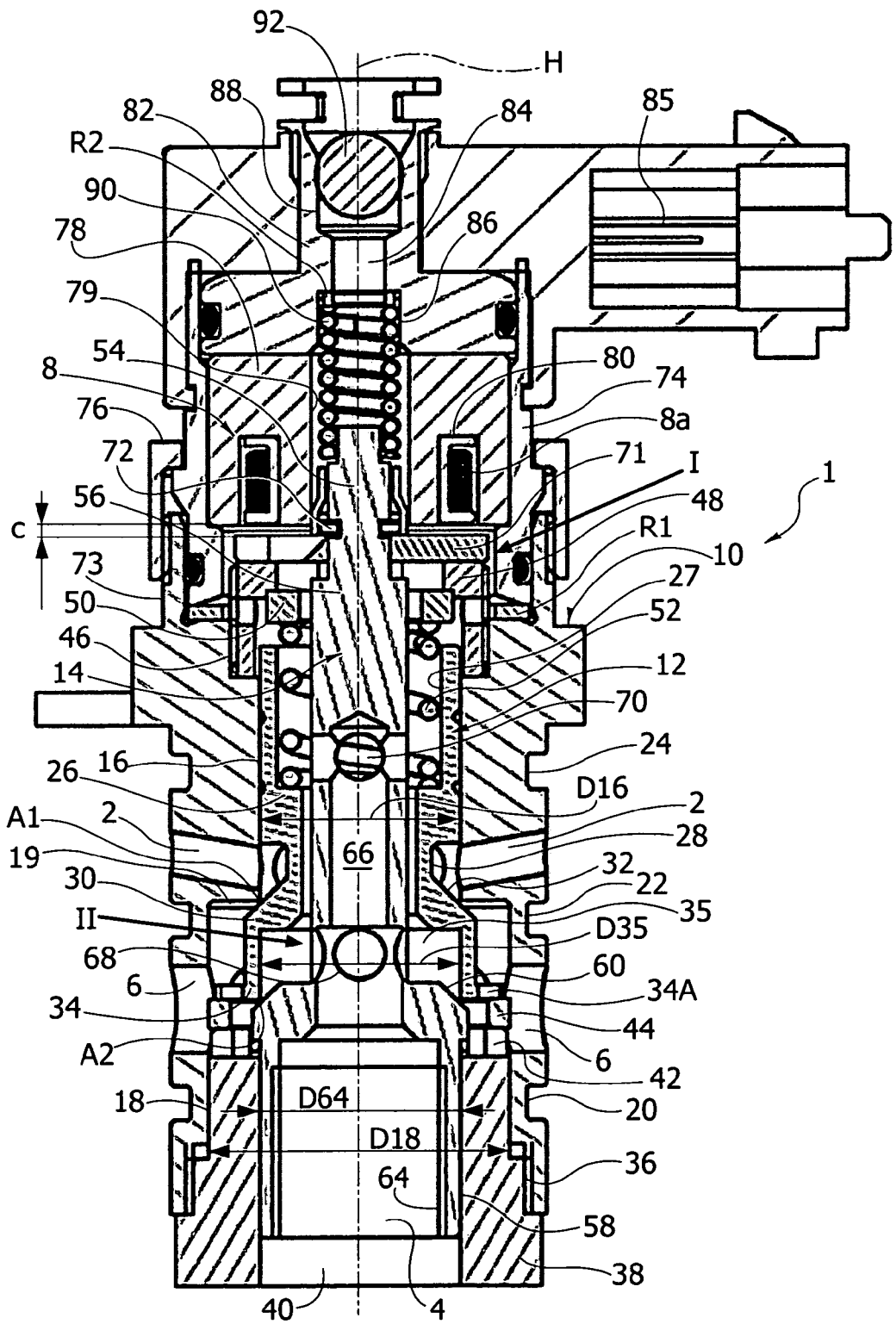
FIG. 7A shows a cross-sectional view of a preferred embodiment of the solenoid valve used in the control system of FIGS. 4-6.
Figure 7B:
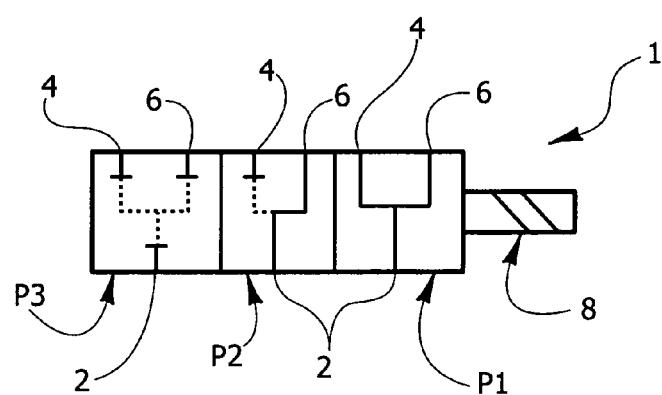
FIG. 7B shows a diagram of the valve of FIG. 7A.

With reference to FIG. 7A, the reference number 1 designates as a whole the solenoid valve used in the engine of the invention according to a preferred embodiment.

With reference also to the diagram of FIG. 4, the solenoid valve 1 comprises three mouths 2, 4, 6, of which the mouth 2 functions as inlet mouth "i", to be connected to the pressure chamber C of FIG. 4, the mouth 6 functions as outlet "u1", to be connected to the actuator of the intake valve 7A of FIG. 4, and the mouth 4 functions as outlet "u2", to be connected to the exhaust channel 23 of FIG. 4. As will be seen in what follows, also envisaged is a variant in which the function of the mouths 2 and 6 is switched round so that the mouth 6 functions as inlet "i", the mouth 2 functions as outlet "u1", and the mouth 4 functions once again as outlet "u2".

With reference to FIG. 7A, the solenoid valve 1 comprises a plurality of components coaxial to one another and sharing a main axis H. In particular, the solenoid valve 1 comprises a valve body or jacket 10, housed in which are a first open/close element and a second open/close element 12, 14 and the electromagnet 8 containing the solenoid 8a. Moreover provided on the jacket 10 are the mouths 2, 6, while, as will emerge more clearly from the ensuing description, the mouth 4 is provided by means of the open/close element 14 itself.

The jacket 10 is traversed by a through hole sharing the axis H and comprising a first stretch 16 having a first diameter D16 and a second stretch 18 comprising a diameter D18, where the diameter D18 is greater than the diameter D16. In a position corresponding to the interface between the two holes a shoulder 19 is thus created.

The mouths 2, 6 are provided by means of through holes with radial orientation made, respectively, in a position corresponding to the stretch 16 and in a position corresponding to the stretch 18 and in communication with said stretches.

Moreover provided on an outer surface of the jacket 10 are a first annular groove 20, a second annular groove 22, and a third annular groove 24, each designed to receive a gasket of an O-ring type, arranged on opposite sides with respect to the radial holes that define the mouth 2 and to the radial holes that define the mouth 6.

In particular, the mouth 6 is comprised between the grooves 20 and 22 whilst the mouth 2 is comprised between the grooves 22 and 24.

Preferably, the three annular grooves 20, 22, 24 are provided with the same seal diameter so as to minimize the unbalancing induced by the resultant of the forces of pressure acting on the outer surface of the jacket 10, which otherwise would be such as to jeopardize fixing of the jacket of the solenoid valve in the corresponding seat provided on a component or in an oleodynamic circuit where it is installed.

The first open/close element 12 is substantially configured as a hollow tubular element comprising a stem 26—which is hollow and provided in which is a first cylindrical recess 27—, a neck 28, and a head 30, which has a conical contrast surface 32 and a collar 34. The neck 28 has a diameter smaller than that of the stem 26.

Moreover, preferably provided in the collar 34 is a ring of axial holes 34A, whilst a second cylindrical recess 35 having diameter D35 is provided in the head 30.

The stem 26 of the open/close element 12 is slidably mounted within the stretch 16 in such a way that the latter functions as guide element and as dynamic-seal element for the open/close element 12 itself: the dynamic seal is thus provided between the environment giving out into which is the first mouth 2 and the environment giving out into which is the second mouth 4. This, however, gives rise to slight leakages of fluid through the gaps existing between the open/close element 12 and the stretch 16: the phenomenon is typically described as "hydraulic consumption" of the solenoid valve, and depends upon the difference in pressure between the environments straddling the dynamic seal itself, upon geometrical parameters of the gaps (in particular the axial length, linked to the length of the stem 26, and the diametral clearance) and, not least, upon the temperature of the fluid, which as is known determines the viscosity thereof.

The axial length of the stem 26 is chosen in such a way that it will extend along the stretch 16 as far as the holes that define the mouth 2, which thus occupy a position corresponding to the neck 28 that substantially forms an annular fluid chamber.

The head 30 is positioned practically entirely within the stretch 18, except for a small surface portion 32 that projects within the stretch 16 beyond the shoulder 19. In fact, the head 30 has a diameter greater than the diameter D16 but smaller than the diameter D18, so that in a position corresponding to the shoulder 19 a first contrast seat A1 is provided for the open/close element 12, in particular for the conical surface 32.

In a variant of the solenoid valve of FIG. 7A, in a position corresponding to the shoulder 19 an annular chamfer is made that increases the area of contact with the conical surface 32, at the same time reducing the specific pressure developed at the contact therewith, hence minimizing the risks of damage to the surface 32. It is in any case important for the seal diameter between the open/close element 12 and the shoulder 19 to be substantially equal to the diameter D16. Provided at a first end of the jacket 10 is a first threaded recess 36 in which a bushing 38 having a through guide hole 40 sharing the axis H is engaged. The diameter of the hole 40 is equal to the diameter D35 for reasons that will emerge more clearly from the ensuing description.

The bushing 38 comprises a castellated end portion 42 that functions as contrast element for a spacer ring 44.

The spacer ring 44 offers in turn a contrast surface to the head 30 of the open/close element 12, in particular to the collar 34. Moreover, the choice of the thickness of the spacer ring 44 enables adjustment of the stroke of the open/close element 12 and hence the area of passage between the mouth 2 and the mouth 6. At a second end of the jacket 10, opposite to the first end, a second threaded recess 46 is provided in which a ringnut 48 is engaged. The ringnut 48 functions as contrast for a ring 50, which in turn offers a contrast surface for a first elastic-return element 52 housed in the cylindrical recess 27.

The ringnut 48 is screwed within the threaded recess 46 until it comes to bear upon the shoulder between the latter and the jacket 10: in this way, the adjustment of the pre-load applied to the elastic-return element 52 is determined by the thickness (i.e., by the band width) of the ring 50.

The second open/close element 14 is set inside the stem 26 and is slidable and coaxial with respect to the first open/close element 12.

The open/close element 14 comprises:
a terminal shank 54 at a first end thereof;
a stem 56; and
a head 58, located at a second end thereof, having a conical contrast surface 60 and a cup-shaped end portion 64, where the head 58 and the shank 54 are connected by the stem 56.

It should moreover be noted that the geometry of the castellated end 42 contributes to providing, by co-operating with the holes 34a, a passageway for the flow of fluid that is sent on through the section of passage defined between the conical surface 60 and the contrast seat A2 towards the second mouth 4.

The cup-shaped end portion 64 has an outer diameter D64 equal to the diameter of the hole 40 and comprises a recess that constitutes the outlet of a central blind hole 66 provided in the stem 56. The hole 66 intersects a first set and a second set of radial holes, designated, respectively, by the reference numbers 68, 70. In this embodiment the two sets each comprise four radial holes 68, 70 set at the same angular distance apart.

The position of the aforesaid sets of radial holes is such that the holes 68 substantially occupy a position corresponding to the cylindrical recess 35, whilst the holes 70 substantially occupy a position corresponding to the cylindrical recess 27.

The coupling between the cup-shaped end portion 64 (having diameter D64) and the hole 40 (having a diameter substantially equal to the diameter D64) provides a dynamic seal between the open/close element 14 and the bushing 38: this seal separates the environment giving out into which is the third mouth 6 from the environment giving out into which is the second mouth 4. In a way similar to what has been described for the dynamic seal provided between the mouths 2 and 6, the hydraulic consumption depends not only upon the temperature and upon the type of fluid, but also upon the difference in pressure existing between the environments giving out into which are the mouths 2 and 4, upon the diametral clearance, upon the length of the coupling between the cup-shaped end portion 64 and the bushing 38, and upon other parameters such as the geometrical tolerances and the surface finish of the various components. The values of hydraulic consumption of the two dynamic seals are added together and define the total hydraulic consumption of the solenoid valve 1.

Fitted on the terminal shank 54 is an anchor 71 provided for co-operating with the solenoid 8, which has a position reference defined by a half-ring 72 housed in an annular groove on the shank 54. Advantageously, the anchor 71 can be provided as a disk comprising notches with the dual function of reducing the overall weight thereof and reducing onset of parasitic currents.

Provided at a second end of the jacket 10, opposite to the one where the bushing 38 is situated, is a collar 73, inserted within which is a cup 74, blocked on the collar 73 by means of a threaded ringnut 76, which engages an outer threading made on the collar 73.

Set in the cup 74 is a toroid 78 housing the solenoid 8, which is wound on a reel 80 housed in an annular recess of the toroid 78 itself. The toroid 78 is traversed by a through hole 79 sharing the axis H and is surmounted by a plug 82 bearing thereon and blocked on the cup 74 by means of a cap 84 bearing a seat for an electrical connector 85 and electrical connections (not visible) that connect the electrical connector to the solenoid 8.

The toroid 78 comprises a first base surface, giving out onto which is the annular recess 79, which offers a contrast to the anchor 71, determining the maximum axial travel (i.e., the stroke) thereof, designated by c. The maximum axial travel of the anchor 71 is hence determined by subtracting the thickness of the anchor 71 itself (i.e., the band width thereof) from the distance between the first base surface of the toroid 78 and the ringnut 48. In order to adjust the stroke c of the anchor 71 $a$ first adjustment shim R1 is provided preferably made as a ring having a calibrated thickness; alternatively, it is possible to replace the anchor 71 with an anchor of a different thickness. The stroke c of the anchor 71 is hence constituted by three components:

- a first component $c_v$, which represents the loadless stroke and terminates when the top surface of the anchor engages the half-ring 72;
- a second component $\Delta h_{14}$, which corresponds to the displacement of just the second open/close element 14;
- a third component $\Delta h_{12}$, which corresponds to the simultaneous displacement of both of the open/close elements.

It should moreover be noted that the pressure of the fluid in the environment giving out into which is the mouth 4 exerts its own action also on the anchor 71, on the toroid 78, on the elastic element 90, on the ringnut 48, and on the shank 54 of the open/close element 14. This calls for adoption, in order to protect the electromagnet 8, of static-seal elements.

The plug 82 comprises a through hole 84 sharing the axis H and comprising a first stretch with widened diameter 86 and a second stretch with widened diameter 88 at opposite ends thereof. It should be noted that the through hole 84 enables, by introducing a measuring instrument, verification of the displacements of the open/close element 14 during assemblage of the solenoid valve 1.

The stretch 86 communicates with the hole 79 and defines a single cavity therewith, set inside which is a second elastic-return element 90, co-operating with the second open/close element 14. The elastic-return element 90 bears at one end upon a shoulder made on the shank 54 and at another end upon a second adjustment shim R2 bearing upon a shoulder created by the widening of diameter of the stretch 86. The adjustment shim R2 has the function adjustment of the pre-load of the elastic element 90.

Forced in the stretch 88 is a ball 92 that isolates the hole 84 with respect to the environment preventing accidental exit of liquid.

All the components so far described are coaxial to one another and share the axis H.

Operation of the solenoid valve 1 is described in what follows.

In the first example described here, the solenoid valve 1 is inserted in the circuit illustrated schematically in FIG. 4 in such a way that the mouths 2, 4, 6 represent, respectively, the inlet "i", the outlet "u2", and the outlet "u1", each having its own pressure level—respectively $p_2$, $p_4$, $p_6$—and such that $p_2 > p_6 > p_4$. As will be illustrated hereinafter, also different connections of the mouths 2, 4, 6 to the three environments C, 7A and 23 of FIG. 4 are on the other hand possible.

Figure 7C:
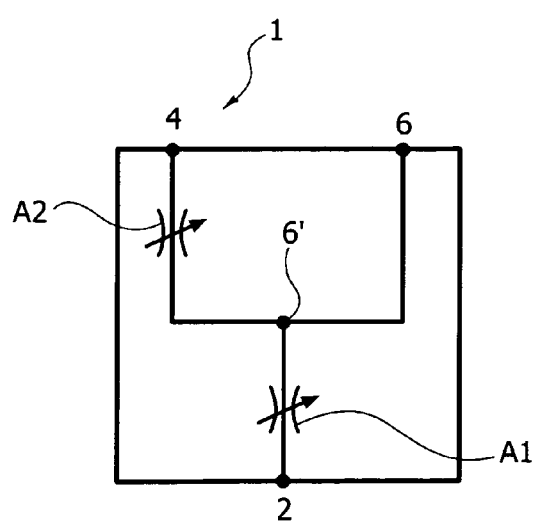
FIG. 7C shows another schematic representation of the solenoid valve of FIG. 7A, whilst
Figure 7D:
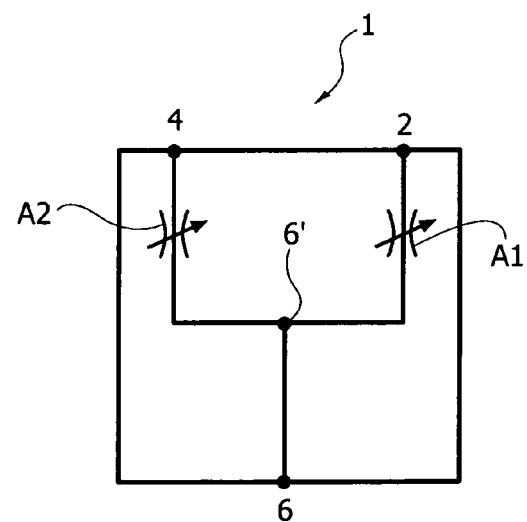
FIG. 7D illustrates a variant of FIG. 7C.

FIG. 7C shows a single-line diagram that represents the solenoid valve 1 in a generic operating position: it should be noted how arranged between the first mouth 2 and the second mouth 4 are two flow restrictors with variable cross section A1 and A2, which represent schematically the ports provided by the first and second open/close elements.

In the node between the mouths 2, 4 and 6, designated by 6', the value of the pressure is equal to the value in the region of the third mouth 6 but for the pressure drops along the branch 6-6'. Set between the mouth 4 and the node 6' is the flow restrictor A2, which schematically represents the action of the second open/close element 14. Likewise, set between the mouth 2 and the node 6' is the flow restrictor with variable cross section A1, which schematically represents the action of the first open/close element 12.

The positions P1, P2, P3 correspond to particular values of the section of passage of the flow restrictors A1, A2, in turn corresponding to different positions of the open/close elements 12, 14, as will emerge more clearly from the ensuing description. In particular:

position P1: A1, A2 have a maximum area of passage;
position P2: A1 has a maximum area of passage, A2 has a zero area of passage;
position P3: A1, A2 have a zero area of passage.

FIG. 7A illustrates the first operating position P1 of the solenoid valve 1, where the first and second open/close elements 12, 14 are in a resting position. This means that no current traverses the solenoid 8 and no action is exerted on the anchor 71 so that the open/close elements 12, 14 are kept in position by the respective elastic-return elements 52, 90.

In particular, the first open/close element 12 is kept bearing upon the ring 44 by the first elastic-return element 52, whilst the second open/close element 14 is kept in position thanks to the anchor 71: the second elastic-return element 90 develops its own action on the shank 54, and said action is transmitted to the anchor 71 by the half ring 72, bringing the anchor 71 to bear upon the ringnut 48.

In this way, with reference to FIGS. 7, 7A, the passage of fluid from the inlet mouth 2 to the first outlet mouth 4 and to the second outlet mouth 6 is enabled. In fact, the fluid entering the radial holes that define the mouth 2 invades the annular volume around the neck 28 of the first open/close element 12 and traverses a first gap existing between the conical surface 32 and the first contrast seat A1.

In said annular volume there is set up, on account of the head losses due to traversal of the radial holes that define the mouth 2, a pressure $p_6 > p_4$. In this way, the fluid proceeds spontaneously along its path towards the mouth 4 traversing the second gap set between the conical surface 60 and the second contrast seat A2.

In this way, the fluid can invade the cylindrical recess 35 and pass through the holes 68, invading the cup-shaped end portion 64 and coming out through the hole 40. It should be noted that the pressure that is set up in the volume of the cylindrical recess 35 is slightly higher than the value $p_4$ by virtue of the head losses due to traversal of the holes 68. Finally, it should be noted that the open/close element 12 itself and the guide bushing 38 define the second mouth 4.

Figure 10A:
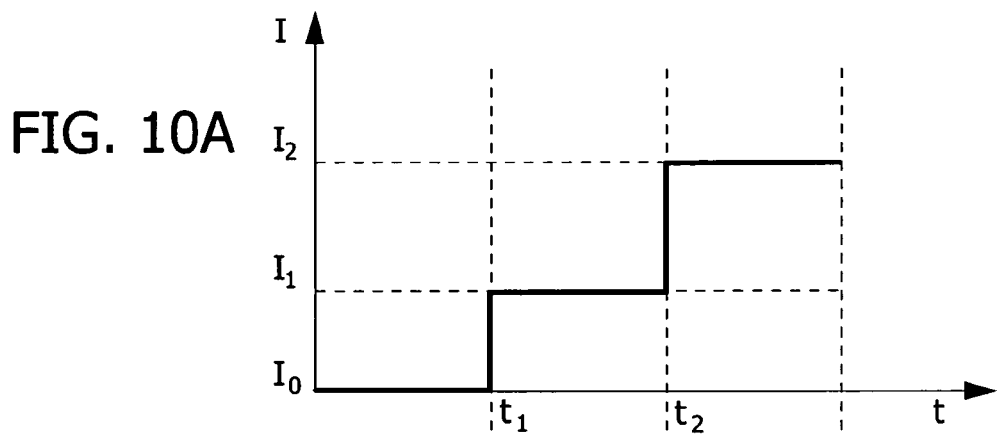
FIGS. 10A, 10B, and 10C illustrate diagrams that show the variation of some characteristic quantities of operation of the solenoid valve of FIG. 7A.
Figure 10B:
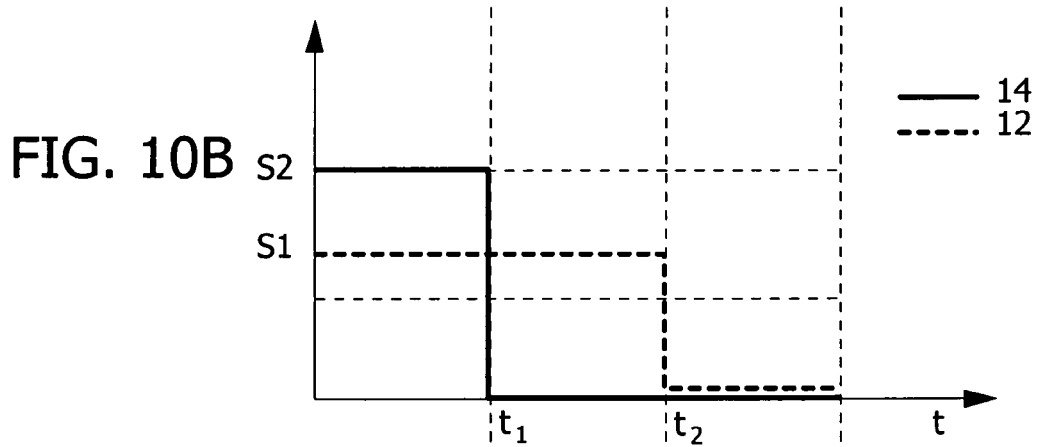
Figure 10C:
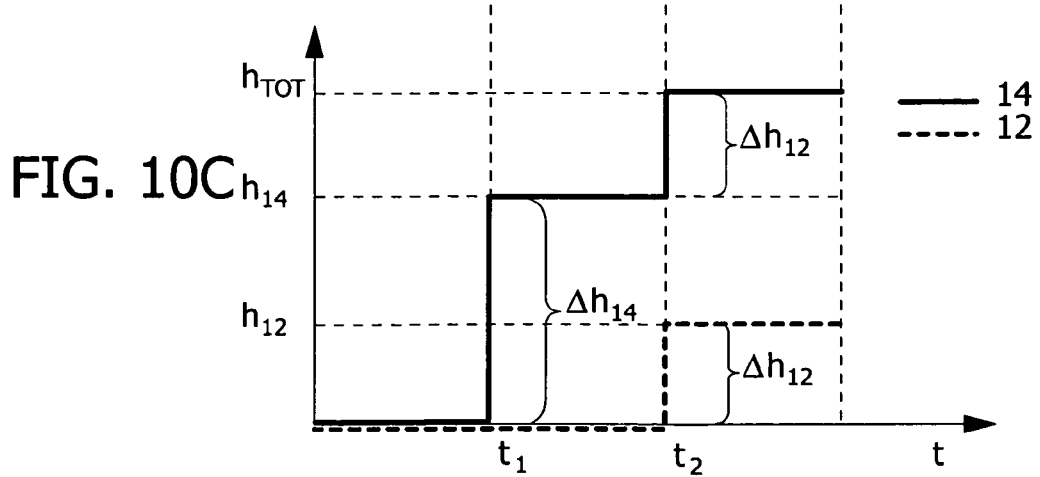

The graphs of FIGS. 10A, 10B, and 10C illustrate the time plots of various operating quantities of the solenoid valve 1, observed in particular during a time interval in which there occur two events of switching of the operating position of the solenoid valve 1.

The graph of FIG. 10A represents the time plot of a current of energization of the solenoid 8, the graph of FIG. 10B represents the time plot of the area of passage for the fluid afforded by the sections of passage created by the open/close elements 12, 14 co-operating with the respective contrast seats A1, A2, and the graph of FIG. 10C represents the time plot of the absolute (partial) displacements $h_{12}$, $h_{14}$ of the open/close elements 12, 14, assuming as reference (zero displacement) the resting position of each of them. The reference $h_{TOT}$ is the overall displacement of the open/close element 14, equal to the sum of the displacement $h_{12}$ and of the partial displacement $h_{14}$.

Corresponding to the operating position P1 illustrated in FIG. 4 is a current of energization of the solenoid 8 having an intensity $I_o$ with zero value (FIG. 10A).

At the same time, with reference to FIG. 10B, in the operating position P1 the second open/close element 14 defines with the contrast seat A2 a gap having an area of passage S2, whilst the first open/close element 12 defines with the contrast seat A1 a gap having an area of passage S1, which in this embodiment is smaller than the area S2. The function of dividing the total stroke $h_{tot}$ into the two fractions $\Delta h_{12}$ and $\Delta h_{14}$ is entrusted to the shim 44.

In addition, with reference to FIG. 10C, in the operating position P1 the displacements of the open/close elements 12, 14 with respect to the respective resting positions are zero.

Figure 8A:
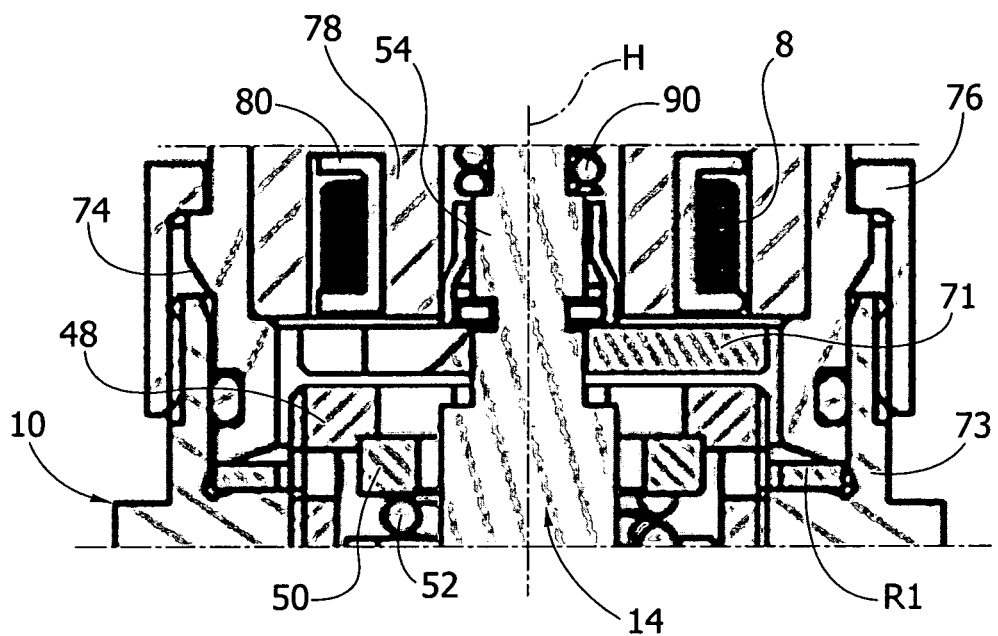
FIGS. 8A, 8B illustrate at an enlarged scale two details indicated by the arrows I and II in FIG. 7A, with reference to the second operating position of the solenoid valve according to the invention.
Figure 8B:
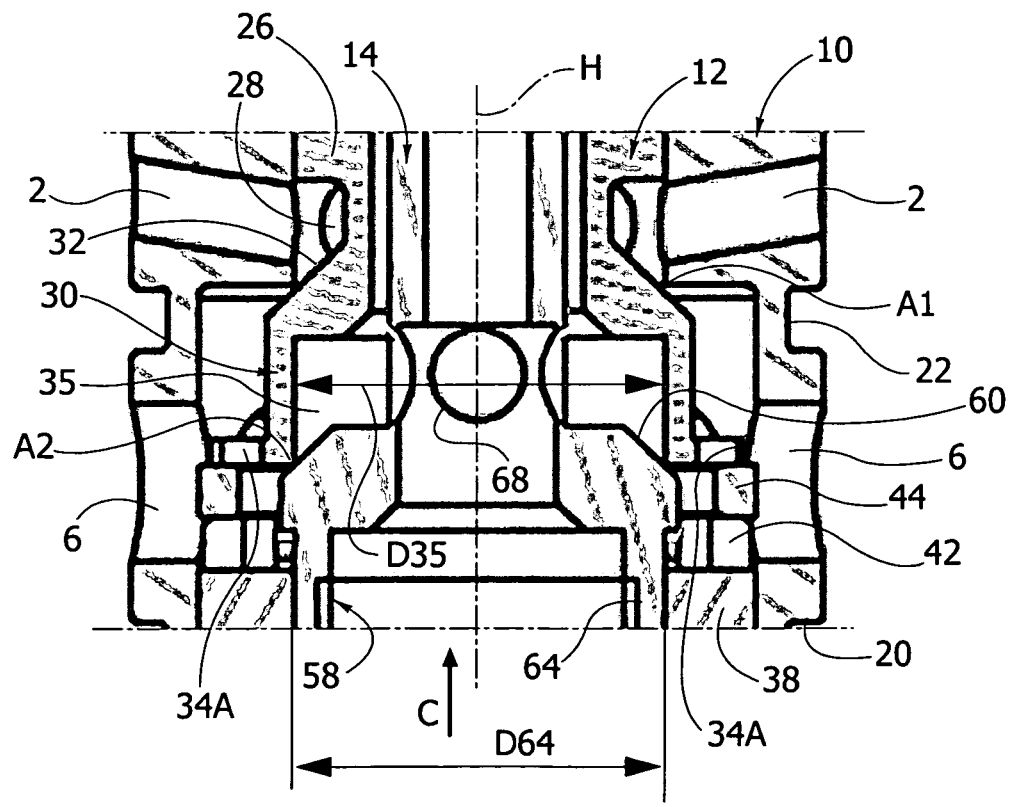

With reference to FIGS. 8A, 8B, the enlargements illustrate in detail the configuration of the open/close elements in the operating position P2.

The operating position P2 is activated following upon a first event of switching of the solenoid valve 1, which occurs at an instant $t_1$ in which an energization current of intensity $I_1$ is supplied to the solenoid 8.

The intensity $I_1$ is chosen in such a way that the action of attraction exerted by the solenoid 8 on the anchor 71 will be such as to overcome just the force developed by the elastic-return element 90. In other words, the solenoid 8 is actuated for impressing on the second open/close element a first movement $\Delta h_{14}$ in an axial direction H having a sense indicated by C in FIG. 8B by means of which the second open/close element, in particular the conical surface 60, is brought into contact with the second contrast seat A2 disabling the passage of fluid from the first mouth 2 to the second mouth 4, and thus providing a transition from the first operating position P1 to the second operating position P2.

With reference to the graphs of FIGS. 10A, B, C, the above is equivalent to a substantial annulment of the area of passage S2 and to a displacement $\Delta h_{14}$ of the open/close element 14 in an axial direction and with sense C. The anchor 71 is detached from the ringnut 48 and substantially occupies an intermediate position between the later and the toroid 78.

It should be noted that the movement of the open/close element 14 stops in contact with the contrast seat A2 since, in order to proceed, it would be necessary to overcome also the action of the elastic element 52, which is impossible with the energization current of intensity $I_1$ that traverses the solenoid 8.

The open/close element 14 (like the open/close element 12, see the ensuing description) is moreover hydraulically balanced. Consequently, it is substantially insensitive to the values of pressure with which the solenoid valve 1 is operating.

The term "hydraulically balanced" referred to each of the open/close elements 12, 14 is meant to indicate that the resultant in the axial direction (i.e., along the axis H) of the forces of pressure acting on the open/close element is zero. This is due to the choice of the surfaces of influence on which the action of the pressurized fluid is exerted and of the dynamic-seal diameters (in this case also guide diameters) of the open/close elements. In particular, the dynamic-seal diameter of the open/close element 14 is the diameter D64, which is identical to the diameter D35 of the cylindrical recess D35, which determines the seal surface of the open/close element 14 at the contrast seat A2 provided on the open/close element 12.

The same applies to the open/close element 12, where the dynamic-seal diameter is the diameter D16, which is equal to the diameter of the stem 26 (but for the necessary radial plays) and coincides with the diameter of the contrast seat A1, provided on the jacket 10, which determines the surface of influence of the open/close element 12.

In a particular variant, it is possible to design the solenoid valve 1 in such a way that the diameters D64 and D35 associated to the open/close element 14 are substantially equal to the diameter D16 and to the diameter of the seat A1 of the open/close element 12.

Figure 9A:
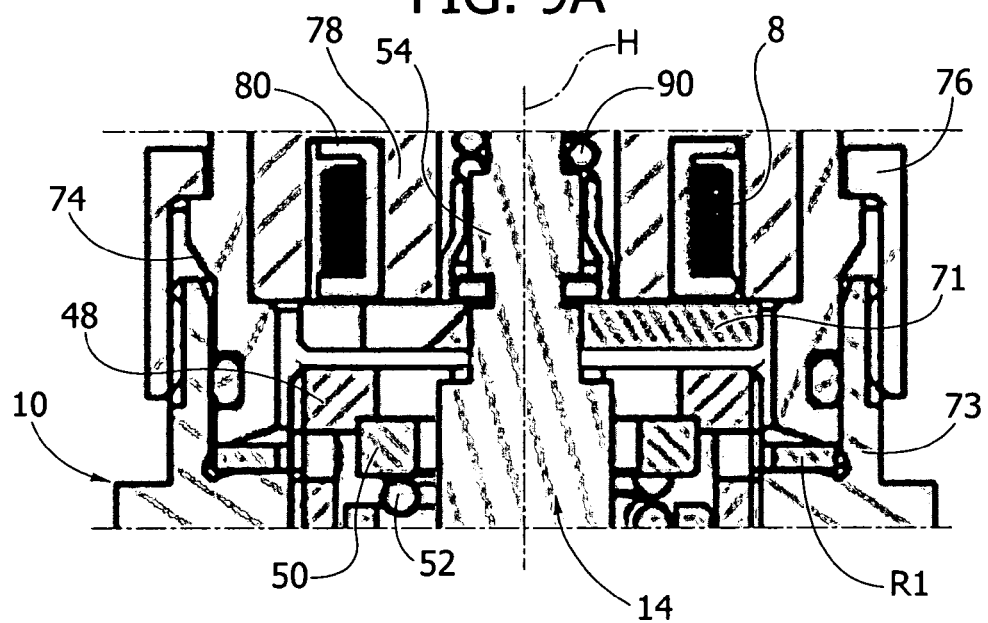
FIGS. 9A, 9B show the same details of FIGS. 8A, 8B, but with reference to the third operating position of the solenoid valve.
Figure 9B:
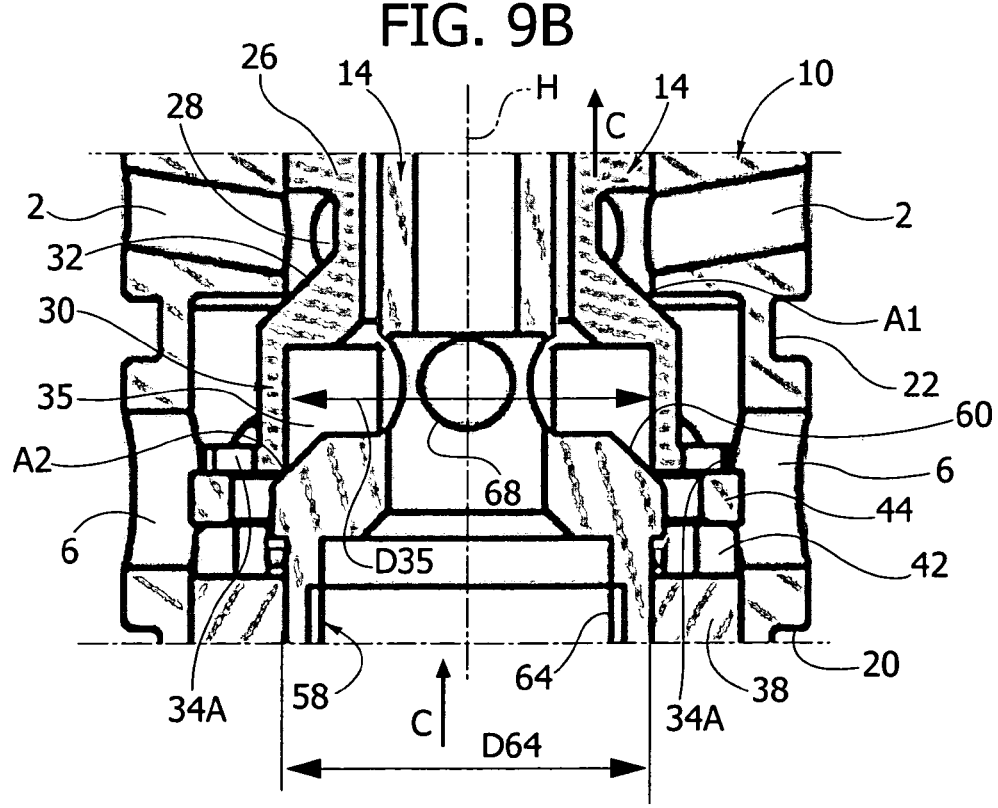

The configuration of the open/close elements 12, 14 in the third operating position P3 is illustrated in FIGS. 9A, 9B. With reference moreover to FIGS. 10A, 10B, 10C at an instant $t_2$ a command is issued for an increase of the energization current that traverses the solenoid 8, which brings the intensity thereof from the value $I_1$ (maintained throughout the time interval that elapses between $t_1$ and $t_2$) to a value $I_2 > I_1$.

This causes an increase of the force of attraction exerted by the solenoid 8 on the anchor 71, whereby a second movement is impressed on the second open/close element 14, subsequent to the first movement, thanks to which the second open/close element 14 draws the first open/close element 12 into contact against the first contrast surface A1, hence disabling the passage of fluid from the mouth 2 to the mouth 6. In fact, there is no longer any gap through which the fluid that enters the mouth 2 can flow towards the mouth 6. The diagram of FIG. 4B is a graphic illustration of the annulment of the section of passage S1 at the instant $t_2$.

It should be noted that, for the reasons described previously, during the aforesaid second movement, in which the open/close element 12 is guided by the bushing 38, the second open/close element 14 remains in contact with the first open/close element 12 keeping passage of fluid from the mouth 2 to the mouth 4 disabled. The corresponding displacement of the open/close element 14, which is the same that the open/close element 12 undergoes (both of which in the axial direction and with sense C), is designated by $Ah_{12}$ in FIG. 4C.

There is thus obtained a transition from the second operating position P2 to the third operating position P3, in which, in actual fact, the environments connected to each of the mouths of the solenoid valve 1 are isolated from one another, except for the flows of fluid that leak through the dynamic seals towards the environment with lower pressure, i.e., towards the second mouth 4. In the design stage, the dynamic seals are conceived in such a way that any leakage of fluid will in any case be negligible as compared to the leaks that can be measured when the solenoid valve is in the operating positions P1 and/or P2.

The higher intensity of current that circulates in the solenoid 8 is necessary to overcome the combined action of the elastic-return elements 90 and 52, which tend to bring the respective open/close elements 14, 12 back into the resting position.

It should be noted that also in this circumstance, given that the open/close element 12 is hydraulically balanced, the action of attraction developed on the anchor 71 must overcome only the return force of the springs 90, 52, in so far as the dynamic equilibrium of the open/close elements 12, 14 is irrespective of the action of the pressure of the fluid, given that said open/close elements are hydraulically balanced.

In this way, it is possible to choose a solenoid 8 of contained dimensions and it is hence possible to work with contained energization currents and with times of switching between the various operating positions of the solenoid valve contained within a few milliseconds, for example, operating with a pressure $p_2$ in the region of 400 bar. Other typical values of pressure for the environment connected to the fluid-inlet mouth are 200 and 300 bar (according to the type of system).

Figure 11:
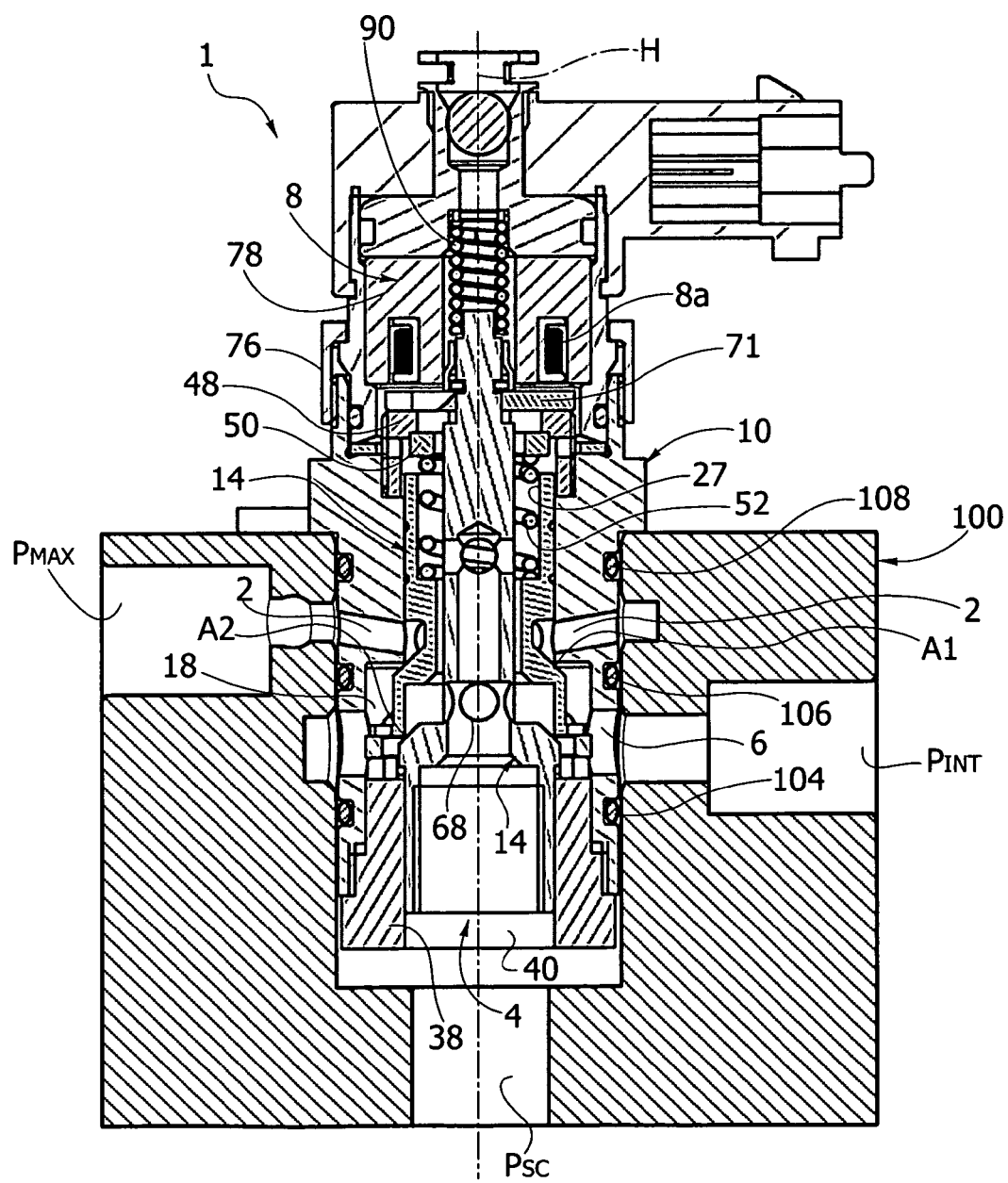
FIG. 11 is a cross-sectional view of an example of installation of the solenoid valve of FIG. 7A.

With reference to FIG. 11, the solenoid valve 1 constitutes a cartridge that is inserted in a body 100, which incorporates elements for connection to the three environments, namely, the pressure chamber C, the actuator of the intake valve 7A, and the exhaust channel 23, visible in FIG. 4, which are respectively at pressure levels $p_{MAX}$ (or control pressure), $p_{INT}$ (intermediate pressure), and $p_{SC}$ (exhaust pressure), which is lower than the intermediate pressure $p_{INT}$.

It should moreover be noted that the solenoid valve 1 is inserted in the body 100 in a seat 102 in which there is a separation of the levels of pressure associated to the individual environments by means of three gaskets of an O-ring type designated by the reference numbers 104, 106, 108 and housed, respectively, in the annular grooves 20, 22, and 24.

In particular, the O-ring 104 guarantees an action of seal in regard to the body across the environments that are at $p_{SC}$ and $p_{INT}$, whereas the O-ring 106 guarantees an action of seal in regard to the body across the environments that are at $p_{INT}$ and $p_{MAX}$. The last O-ring, designated by the reference number 108, exerts an action of seal that prevents any possible leakage of fluid on the outside of the body.

Of course, it is possible to exploit the potentialities of modern electronic control units so as to impart high-frequency signals to the solenoid valve 1 obtaining very fast switching. This is advantageous in so far as it is not possible to provide a direct switching from the operating position P3 to the operating position P1.

It should be noted that in this perspective it is extremely important for the open/close elements 12 and 14 to be hydraulically balanced, in so far as if it were not so, excessively high forces of actuation would be necessary to guarantee the required dynamics, which in turn would call for an oversizing of the components (primarily the solenoid 8) in addition to a dilation of the switching times, which might not be compatible with constraints of space and with the operating specifications typical of the systems discussed herein.

Of course, the details of construction and the embodiments may vary widely with respect to what is described and illustrated herein, without thereby departing from the sphere of protection of the present invention, as defined by the annexed claims.

For example, the seals between the open/close elements 12, 14 and the respective contrast seats A1, A2 can be provided by means of the contact of two conical surfaces, in which the second conical surface replaces the sharp edges of the shoulders on which the contrast seats are provided.

In addition, as an alternative to the dynamic seals provided by means of radial clearance between the moving elements described previously, it is possible to adopt dynamic-seal rings, specific for the use of interest.

For example, the rings can be of a self-lubricating type, hence with a low coefficient of friction, so as not to introduce high forces of friction and not to preclude operation of the valve itself.

Figure 12:
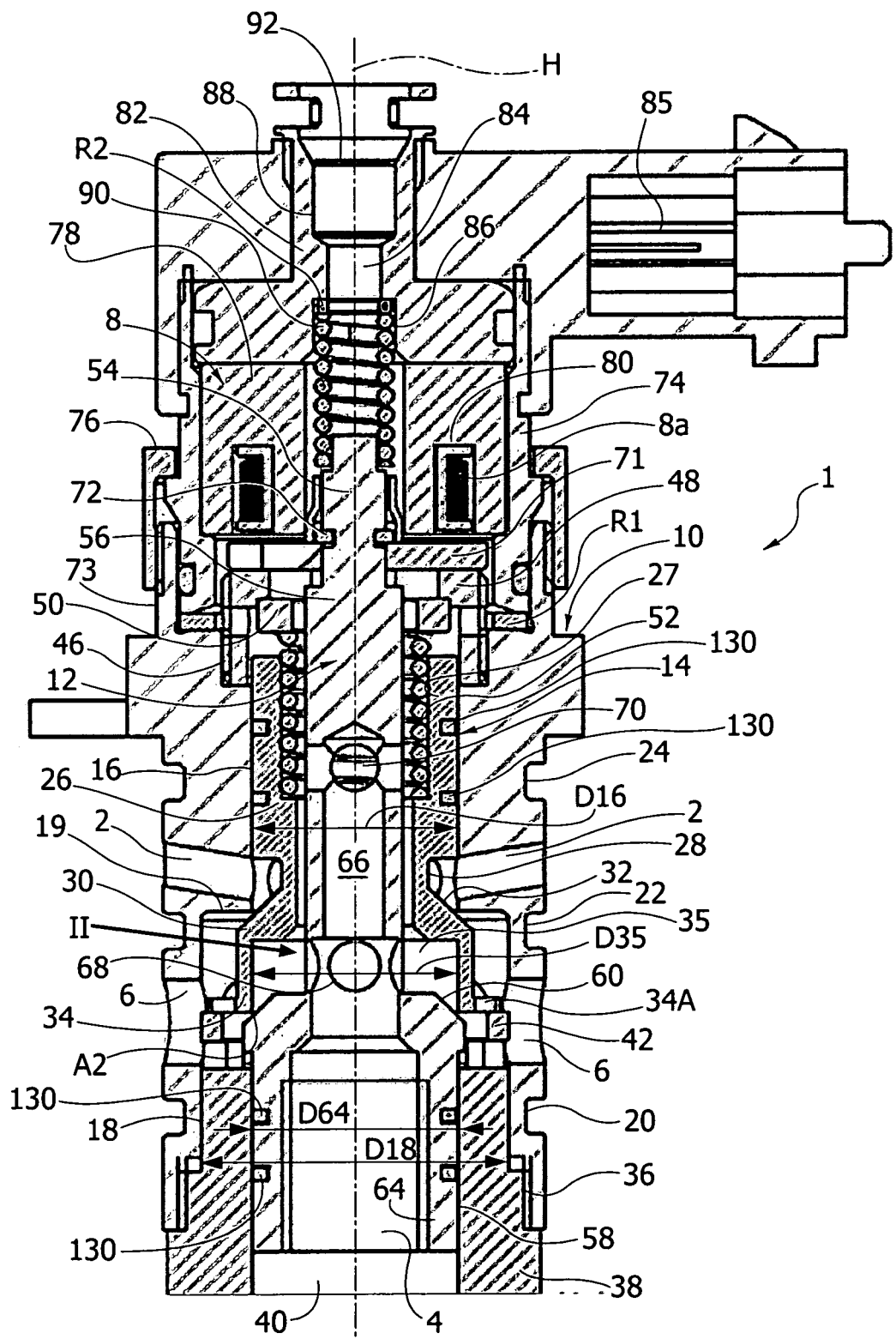
FIG. 12 is a cross-sectional view of a variant of the solenoid valve of FIG. 7A.

FIG. 12 illustrates, by way of example, an embodiment of the solenoid valve 1 that envisages the use of dynamic-seal rings designated by the reference number 130.

In the example described so far, there has been assumed the hydraulic connection of the mouth 4 with the exhaust environment and the hydraulic connection of the mouth 6 with the actuator of the valve 7A, at a pressure intermediate between the pressure $p_2$ and the pressure $p_4$.

By reversing the connection of the mouths 4 and 6 to the respective environments, i.e., by connecting the mouth 4 to the actuator of the valve 7A and the mouth 6 to the exhaust environment, the behaviour of the solenoid valve 1 varies.

In particular, in the operating position P1 of the solenoid valve, as has been defined previously, the pressure chamber C connected to the mouth 2 and the actuator of the intake valve 7A connected to the mouth 4 will be set in the discharging condition and the leaks of fluid will have a direction going from the environment connected to the mouth 4 to the environment connected to the mouth 6.

By switching the solenoid valve 1 from the operating position P1 to the operating position P2 the environment connected to the second mouth 4 is excluded, whereas only the hydraulic connection remains of the inlet environment connected to the first mouth 2 with the mouth 6, i.e., with the exhaust: as compared to the previous operating position, the flowrate measured at outlet from the mouth 6 will be lower than in the previous case, the contribution of the flow from the mouth 4 to the mouth 6 thus vanishing.

Finally, by switching the solenoid valve 1 from the operating position P2 to the operating position P3, also the hydraulic connection between the environment connected to the mouth 2 and the environment connected to the mouth 6 will be disabled.

The inventors have moreover noted that it is particularly advantageous to use the mouths 2, 4, 6 of the solenoid valve 1 respectively as the outlet "u1", the outlet "u2", and the inlet "i" of FIG. 4, connecting them, respectively, to the actuator of the intake valve 7A of FIG. 4, to the exhaust channel 23, and to the pressure chamber C of FIG. 4, so that $p_6 > p_2 > p_4$.

It should be noted that, unlike the modes of connection described previously in which the mouth 2 functions as inlet mouth for the fluid, in this case the solenoid valve 1 induces lower head losses in the fluid current that traverses it and proceeds from the mouth 6 towards the mouths 2 and 4. This is represented schematically in the single-line diagram of FIG. 7D: if the functions of the mouths 2 and 6 are reversed, the gaps defined by the open/close elements 12, 14 are arranged parallel to one another; i.e., the fluid that from the inlet mouth 6 flows towards the outlet mouths 2 and 4 has to traverse a single gap, in particular the gap between the open/close element 14 and the contrast seat A2 for the fluid that from the mouth 6 proceeds towards the mouth 4, and the gap between the open/close element 12 and the contrast seat A1 for the fluid that from the mouth 6 proceeds towards the mouth 2 (the node 6' thus substantially has the same pressure that impinges on the mouth 6). In the case of the connection in which the mouth 2 functions as inlet mouth for the fluid (FIG. 7C), the fluid that proceeds towards the mouth 4 must traverse both of the gaps, with consequent higher head losses.

Figure 13:
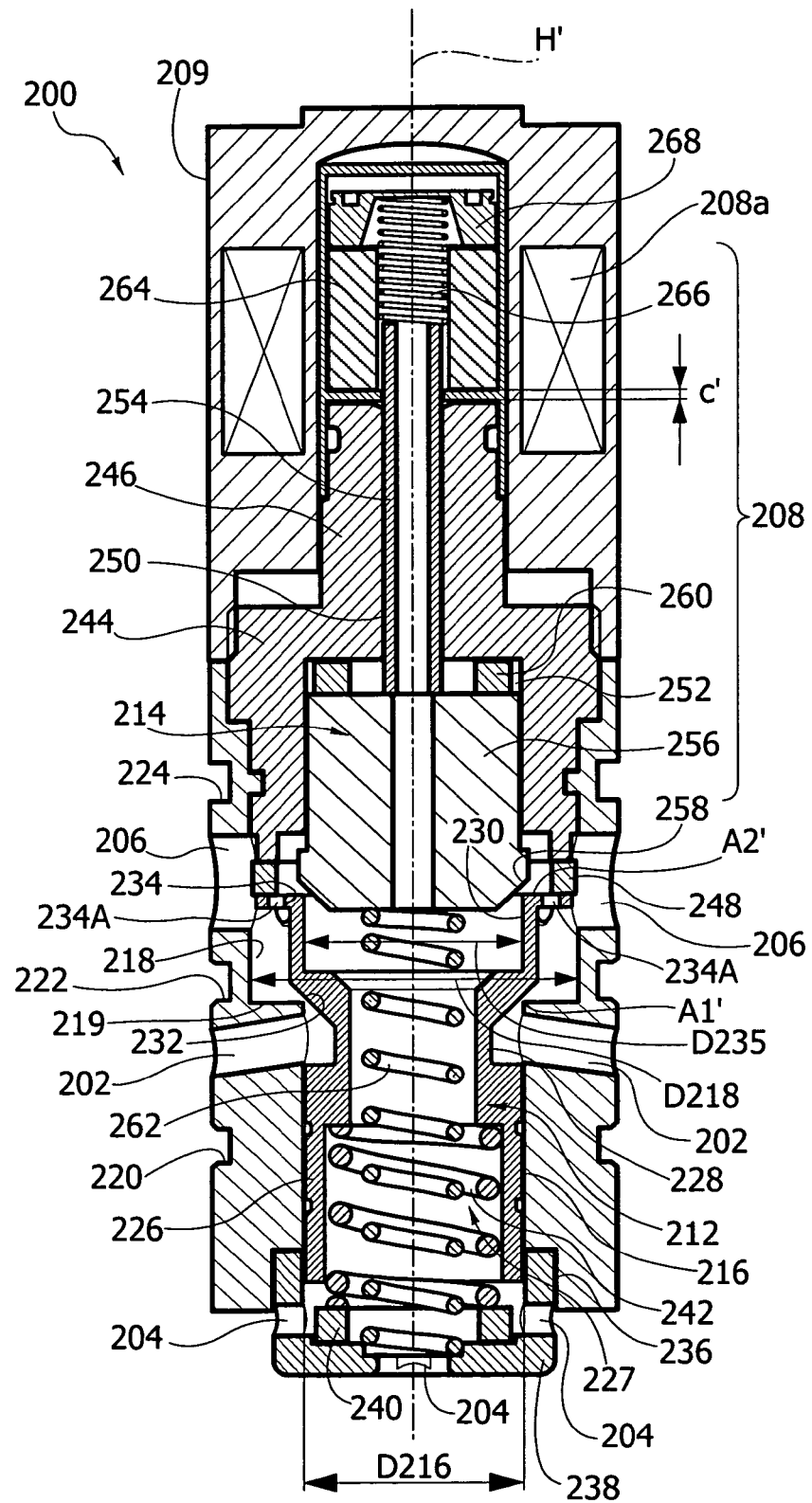
FIG. 13 illustrates a further variant of the solenoid valve.

FIG. 13 illustrates a second embodiment of a solenoid valve according to the invention and designated by the reference number 200.

In a way similar to the solenoid valve 1, the solenoid valve 200 comprises a first mouth 202 for inlet of a working fluid, and a second mouth 204 and a third mouth 206 for outlet of said working fluid.

The solenoid valve 200 can assume the three operating positions P1, P2, P3 described previously, establishing the hydraulic connection between the mouths 202, 204 and 206 as described previously. This means that in the position P1 a passage of fluid from the first mouth 202 to the second mouth 204 and the third mouth 206 is enabled, in the position P2 a passage of fluid from the first mouth 202 to the third mouth 206 is enabled, whereas the passage of fluid from the mouth 202 to the mouth 204 is disabled; finally, in the position P3 the passage of fluid from the mouth 202 tow the mouths 204 and 206 is completely disabled.

An electromagnet 208 comprising a solenoid 208*a* can be controlled for causing a switching of the operating positions P1, P2, P3 of the solenoid valve 200, as will be described in detail hereinafter.

With reference to FIG. 13, the solenoid valve 200 comprises a plurality of components coaxial with one another and sharing a main axis H'. In particular, the solenoid valve 200 comprises a jacket 210, housed in which are a first open/close element 212 and a second open/close element 214 and fixed on which is the solenoid 208*a*, carried by a supporting bushing 209.

Moreover provided on the jacket 210 are the mouths 2, 6, whilst, as will emerge more clearly from the ensuing description, the mouth 4 is provided by means of the open/close element 212.

The jacket 210 is traversed by a through hole sharing the axis H' and comprising a first stretch 216 having a diameter D216 and a second stretch 218 comprising a diameter D218, where the diameter D218 is greater than the diameter D216. At the interface between the two holes there is thus created a shoulder 219.

The mouths 202, 206 are provided by means of through holes with radial orientation made, respectively, in positions corresponding to the stretch 216 and to the stretch 218 and in communication therewith.

Moreover provided on an outer surface of the jacket 10 are a first annular groove 220, a second annular groove 222, and a third annular groove 224, each designed to receive a gasket of an O-ring type, set on opposite sides with respect to the radial holes that define the mouth 202 and the radial holes that define the mouth 206.

In particular, the mouth 206 is comprised between the grooves 222 and 224, while the mouth 2 is comprised between the grooves 220 and 222.

Preferably, the three annular grooves 220, 222, 224 are provided with the same seal diameter so as to minimize the unbalancing induced by the resultant of the forces of pressure acting on the outer surface of the jacket 210, which otherwise would be such as to jeopardize fixing of the jacket of the solenoid valve in the corresponding seat provided on a component or in an oleodynamic circuit where it is installed.

The first open/close element 212 is substantially configured as a hollow tubular element comprising a stem 226—which is hollow and provided in which is a first cylindrical recess 227—, a neck 228, and a head 230, which has a conical contrast surface 232 and a collar 234. The neck 228 has a diameter smaller than that of the stem 226.

In addition, preferably provided in the collar 234 is a ring of axial holes 234A, while a second cylindrical recess 235 having diameter D235 is provided in the head 230.

The stem 226 of the open/close element 212 is slidably mounted within the stretch 216 in such a way that the latter functions as guide element and as dynamic-seal element for the open/close element 212 itself: the dynamic seal is thus provided between the environment giving out into which is the first mouth 202 and the environment giving out into which is the second mouth 4. As has been described previously, this, however, gives rise to slight leakages of fluid through the gaps existing between the open/close element 212 and the stretch 216, contributing to defining the hydraulic consumption of the solenoid valve 200.

The axial length of the stem 226 is chosen in such a way that it will extend along the stretch 216 as far as the holes that define the mouth 202, which thus occupy a position corresponding to the neck 228, which provides substantially an annular fluid chamber.

The head 230 is positioned practically entirely within the stretch 218, except for a small surface portion 232 that projects within the stretch 216 beyond the shoulder 219. In fact, the head 230 has a diameter greater than the diameter D216 but smaller than the diameter D218, so that provided in a position corresponding to the shoulder 19 is a first contrast seat A1' for the open/close element 212, in particular for the conical surface 232.

In a variant of the solenoid valve of FIG. 7A, in a position corresponding to the shoulder 219 an annular chamfer is made that increases the area of contact with the conical surface 232, at the same time reducing the specific pressure developed at the contact therewith, hence minimizing the risks of damage to the surface 232. It in any case important for the seal diameter between the open/close element 212 and the shoulder 219 to be substantially equal to the diameter D216.

Provided at a first end of the jacket 210 is a first threaded recess 236, engaged in which is a bushing 238 comprising a plurality of holes that define the mouth 204. Some of said holes have a radial orientation, whereas one of them is set sharing the axis H'.

The bushing 238 houses a spacer ring 240, fixed with respect to the first open/close element 212, bearing upon which is a first elastic-return element 242 housed within the recess 227. The choice of the band width of the spacer ring 240 enables adjustment of the pre-load of the elastic element 242. Fixed at the opposite end of the jacket 210 is a second bushing 244 having a neck 246 fitted on which is the supporting bushing 209. The bushing 244 constitutes a portion of the magnetic core of the electromagnet 8 and offers a contrast surface to a spacer ring 248 that enables adjustment of the stroke of the first open/close element 212 and functions as contrast surface for the latter against the action of the elastic element 242. In effect, also the bushing 238 functions as contrast for the elastic element 242 in so far as the elastic forces resulting from the deformation of the elastic element are discharged thereon.

The second open/close element 214 is set practically entirely within the bushing 244. In particular, the latter comprises a central through hole 250 that gives out into a cylindrical recess 252, facing the open/close element 212. The open/close element 214 comprises a stem 254 that bears upon a head 256, both of which are coaxial to one another and are arranged sharing the axis H', where the stem 254 is slidably mounted within the hole 250, whereas the head 256 is slidably mounted within the recess 252. It should be noted that, in the embodiment described herein, the stem 254 simply bears upon the head 256 since—as will emerge more clearly—during operation it exerts an action of thrust (and not of pull) on the head 256, but in other embodiments a rigid connection between the stem 254 and the head 256 may be envisaged. The stem 254 is, instead, rigidly connected to the anchor 264.

The head 256 further comprises a conical contrast surface 258 designed to co-operate with a second contrast seat A2' defined by the internal edge of the recess 235.

Set between the head 256 and the bottom of the recess 252 is a spacer ring 260, the band width of which determines the stroke of the second open/close element 214. In addition, the spacer ring 260 offers a contrast surface to the open/close element 214, in particular to the head 256, in regard to the return action developed by a second elastic-return element 262, bearing at one end on the head 256 and at another end on the bushing 238. The elastic element 262 is set sharing the axis H' and inside the elastic element 242.

At the opposite end, the stem 254 is rigidly connected to an anchor 264 of the electromagnet 208, which bears upon a spring 266 used as positioning element. The maximum travel of the anchor 266 is designated by c'.

Preferably, the stroke of the anchor 266 is chosen so as to be equal to or greater than the maximum displacement allowed for the open/close element 214.

Operation of the solenoid valve 200 is described in what follows. In the position illustrated in FIG. 7A, corresponding to the position P1, the fluid that enters through the holes that define the mouth 202 traverses a first gap existing between the surface 232 and the seat A1' and a second gap existing between the seat A2' and the surface 258, flowing into the first open/close element 212 and flowing out from the bushing 238 through the mouth 204. In fact, in the position P1 the open/close elements 212, 214 are kept detached from the respective contrast seats and in contact with the bushing 244 and the spacer ring 260, respectively, thanks to the action of the respective elastic elements 242, 262.

In traversing the first gap, part of the fluid can come out through the holes that define the third mouth 206, whilst another part of the fluid traverses the holes 234a and proceeds towards the second gap.

In order to switch the solenoid valve 200 from the position P1 to the position P2, it is sufficient to govern the electromagnet 208 so as to impress on the second open/close element 214 a first movement that brings the latter, in particular the conical surface 258, to bear upon the second contrast seat A2', thus disabling fluid communication between the first mouth 202 and the second mouth 204. In a way similar to the open/close element 14, the open/close element 214 is hydraulically balanced because the seal diameter, coinciding with the diameter D235 of the contrast seat A2', is substantially equal to the guide diameter, i.e., the diameter of the recess 252.

This means that the force of actuation that must be developed by the electromagnet must overcome substantially just the action of the elastic element 242, remaining practically indifferent to the actions of the pressurized fluid inside the solenoid valve 200.

The aforesaid first movement is imparted on the open/close element 214 by means of circulation, in the solenoid 208a, of a current having an intensity $I_1$ sufficient to displace the anchor 264 by just the distance necessary to bring the open/close element to bear upon the seat A2' and to overcome the resistance of just the elastic element 262.

In order to switch the solenoid valve 200 into the position P3 from the position P2, it is necessary to increase the intensity of the current circulating in the solenoid 208a up to a value $I_2$, higher than the value $I_1$, such as to impart on the open/close element 214 a second movement overcoming the resistance of both of the elastic elements 242, 262. Said second movement results in the movement (in this case with an action of thrust and not of pull as in the case of the solenoid valve 1) of the first open/close element 212 in conjunction with the second open/close element 214 as far as the position in which the first open/close element (thanks to the conical surface 232) comes to bear upon the seat A1', thus disabling the hydraulic connection between the mouths 2 and 4.

Also the open/close element 214 is hydraulically balanced since the seal diameter, i.e., the diameter of the contrast seat A2', is equal to the diameter of the recess 252 in which the head 256 is guided and slidably mounted.

During the second movement the second open/close element 214 remains in contact against the first open/close element 212 maintaining the hydraulic connection between the mouths 202 and 206 closed.

There remain moreover valid the considerations on the various alternatives for the connection of the mouths 202, 204, and 206 to environments with different levels of pressure.

Of course, without prejudice to the principle of the invention, the details of construction and the embodiments may vary widely with respect to what is described purely by way of example herein, without thereby departing from the scope of the claims.

What is claimed is:

1. An internal-combustion engine, comprising, for each cylinder:
   a combustion chamber;
   at least two intake ducts and at least one exhaust duct, which give out into said combustion chamber;
   at least two intake valves and at least one exhaust valve, which are associated to said intake and exhaust ducts and are provided with respective return springs that push them into a closed position;
   a camshaft for actuating the intake valves, by means of respective tappets;
   wherein each intake valve is controlled by the respective tappet against the action of the aforesaid return spring by interposition of hydraulic means including a pressurized-fluid chamber facing which is a pumping plunger connected to the tappets of the at least two intake valves, a pressurized-fluid chamber being designed to communicate with a chamber of a hydraulic actuator associated to each intake valve;
   a single solenoid valve, associated to the intake valves of each cylinder and designed to set in communication said pressurized-fluid chamber with an exhaust channel in order to decouple the intake valves from their respective tappets and cause fast closing of the intake valves as a result of the respective return springs; and electronic control means, for controlling said solenoid valve so as to vary the instant of opening and/or the instant of closing and the lift of each intake valve as a function of one or more operating parameters of the engine, said engine being characterized in that the solenoid valve associated to each cylinder is a three-way, three-position solenoid valve, comprising:

an inlet permanently communicating with said pressurized-fluid chamber and with the hydraulic actuator of a first of the at least two intake valves; and two outlets communicating, respectively, with the hydraulic actuator of the second of at least to intake valves and with said exhaust channel, said solenoid valve having the following three operating positions:

a first position, in which the inlet communicates with both of the outlets so that the actuators of both of the intake valves are set in a discharging condition, and the intake valves are both kept closed by their return springs;

a second position, in which the inlet communicates only with the outlet connected to the actuator of the second intake valve and does not communicate, instead, with the outlet connected to the exhaust channel, so that the pressure chamber is isolated from the exhaust channel, the actuators of both of the intake valves communicate with the pressure chamber, and the intake valves are hence both active; and a third position, in which the inlet does not communicate with any of the two outlets, so that the aforesaid pressure chamber is isolated from the exhaust channel, and the aforesaid first intake valve is active, whilst the second intake valve is isolated from the pressure chamber and is consequently inactive.

2. The engine according to claim 1, wherein a body of the hydraulic actuator of the first intake valve has an exhaust port connected to the exhaust channel, which is overstepped by a plunger of the actuator after a pre-set stroke of said plunger in such a way as to set in a discharging condition a chamber of the actuator and prevent a further movement of said plunger beyond said stroke.

3. The engine according to claim 1, wherein it comprises a line for direct communication between an exhaust environment and the pressure chamber, with a non-return valve interposed in said line to enable a flow of fluid only in a direction of the pressure chamber.

4. The engine according to claim 1, wherein a line is provided for direct communication between a line for supply of the actuator of the second intake valve and an environment common to the pressure chamber and to a line for supply of the actuator of the first intake valve, with a non-return valve interposed in said communication line to enable a flow of fluid only in a direction of the pressure chamber.

5. The engine according to claim 1, wherein said solenoid valve comprises a valve body with a first mouth, a second mouth, and a third mouth that can be used for constituting one said inlet and the others said outlets of said solenoid valve, the solenoid valve further comprising:

a first open/close element and a second open/close element, co-operating, respectively, with a first contrast seat and a second contrast seat;

wherein said first open/close element and said first contrast seat are provided for controlling the passage of fluid from said first mouth to said third mouth; and wherein said second open/close element and said second contrast seat are provided for controlling the passage of fluid from said first mouth to said second mouth;

and in that said solenoid can be actuated for impressing on said second open/close element:

a first movement whereby said second open/close element is brought into contact with said second contrast seat disabling the passage of fluid from said first mouth to said second mouth providing a switching from said first operating position to said second operating position, a second movement, subsequent to said first movement, whereby said second open/close element moves said first open/close element against said first contrast seat disabling the passage of fluid from said first mouth to said third mouth and providing a switching from said second operating position to said third operating position, wherein during said second movement the second open/close element is in contact with said second contrast seat, and wherein moreover said first open/close element and said second open/close element are coaxial to one another and hydraulically balanced.

\* \* \* \* \*